(12) United States Patent
Suh et al.

(10) Patent No.: US 9,930,382 B2
(45) Date of Patent: Mar. 27, 2018

(54) METHOD AND APPARATUS FOR TRANSMITTING/RECEIVING BROADCAST SIGNAL FOR 3-DIMENSIONAL (3D) BROADCAST SERVICE

(71) Applicant: LG ELECTRONICS INC., Seoul (KR)

(72) Inventors: Jongyeul Suh, Seoul (KR); Soojin Hwang, Seoul (KR); Gyoyoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/111,761

(22) PCT Filed: Feb. 10, 2015

(86) PCT No.: PCT/KR2015/001323
§ 371 (c)(1),
(2) Date: Jul. 14, 2016

(87) PCT Pub. No.: WO2015/119477
PCT Pub. Date: Aug. 13, 2015

(65) Prior Publication Data
US 2016/0337670 A1    Nov. 17, 2016

Related U.S. Application Data

(60) Provisional application No. 61/938,087, filed on Feb. 10, 2014.

(51) Int. Cl.
*H04N 21/236* (2011.01)
*H04N 21/235* (2011.01)
(Continued)

(52) U.S. Cl.
CPC ....... *H04N 21/236* (2013.01); *H04N 13/0007* (2013.01); *H04N 13/0059* (2013.01);
(Continued)

(58) Field of Classification Search
None
See application file for complete search history.

(56) References Cited

U.S. PATENT DOCUMENTS

2011/0286530 A1* 11/2011 Tian .................. H04N 21/2365
375/240.25
2012/0069146 A1    3/2012 Lee et al.
(Continued)

FOREIGN PATENT DOCUMENTS

JP    2007-166277 A    6/2007
JP    2010-28261 A    2/2010
(Continued)

OTHER PUBLICATIONS

Communication Group, "White Paper on State of the Art in Compression and Transmission of 3D Video," ISO/IEC JTC1/SC29/WG11 N13364, International Org for Standardisation Organisation Internationale Normalisation Coding of Moving Pictures and Audio, XP055397366, Geneva, Switzerland, Jan. 2013 14 pages.
(Continued)

*Primary Examiner* — Justin Shepard
(74) *Attorney, Agent, or Firm* — Birch, Stewart, Kolasch & Birch, LLP

(57) ABSTRACT

The present invention relates to providing a method and/or an apparatus for transmitting/receiving a broadcast signal for a 3-dimensional (3D) broadcast service. The method for transmitting a broadcast signal according to one embodiment of the present invention comprises the steps of: downsampling each of a left picture frame, a right picture frame, a depth picture frame for the left picture frame and a depth
(Continued)

picture frame for the right picture frame, and encoding a packed frame which packs at least one frame of the down-sampled frames into one frame, generating a broadcast signal comprising signaling information for the encoded packed frame and a picture related to the packed frame; and sending the generated broadcast signal.

14 Claims, 23 Drawing Sheets

(51) Int. Cl.

| | | |
|---|---|---|
| H04N 21/81 | (2011.01) | |
| H04N 21/80 | (2011.01) | |
| H04N 21/2365 | (2011.01) | |
| H04N 21/23 | (2011.01) | |
| H04N 21/2362 | (2011.01) | |
| H04N 13/00 | (2018.01) | |
| H04N 19/597 | (2014.01) | |
| H04N 19/70 | (2014.01) | |
| H04N 19/46 | (2014.01) | |
| H04N 19/85 | (2014.01) | |
| H04N 19/59 | (2014.01) | |
| H04N 21/2343 | (2011.01) | |
| H04N 21/2383 | (2011.01) | |
| H04N 21/43 | (2011.01) | |
| H04N 21/462 | (2011.01) | |
| H04N 21/466 | (2011.01) | |

(52) U.S. Cl.
CPC ............. *H04N 19/46* (2014.11); *H04N 19/59* (2014.11); *H04N 19/597* (2014.11); *H04N 19/70* (2014.11); *H04N 19/85* (2014.11); *H04N 21/23* (2013.01); *H04N 21/235* (2013.01); *H04N 21/2343* (2013.01); *H04N 21/2353* (2013.01); *H04N 21/2356* (2013.01); *H04N 21/2362* (2013.01); *H04N 21/2365* (2013.01); *H04N 21/2383* (2013.01); *H04N 21/23605* (2013.01); *H04N 21/43* (2013.01); *H04N 21/4621* (2013.01); *H04N 21/4668* (2013.01); *H04N 21/80* (2013.01); *H04N 21/81* (2013.01); *H04N 21/816* (2013.01); *H04N 21/8146* (2013.01)

(56) References Cited

U.S. PATENT DOCUMENTS

| | | | |
|---|---|---|---|
| 2013/0162771 A1 | 6/2013 | Suh et al. | |
| 2013/0191250 A1* | 7/2013 | Bradley ............. | G06Q 30/0623 705/26.61 |
| 2013/0250052 A1 | 9/2013 | Suh et al. | |
| 2013/0265391 A1* | 10/2013 | Lee ........................... | H04N 5/57 348/43 |
| 2013/0266289 A1* | 10/2013 | Oyman .................. | H04N 13/00 386/248 |
| 2014/0125650 A1* | 5/2014 | Neill ................... | H04N 13/0011 345/419 |
| 2014/0125780 A1 | 5/2014 | Suh et al. | |

FOREIGN PATENT DOCUMENTS

| | | |
|---|---|---|
| JP | 2012-138856 A | 7/2012 |
| JP | 2012-516114 A | 7/2012 |
| KR | 10-2012-0065943 A | 6/2012 |
| KR | 10-2013-0129212 A | 11/2013 |
| KR | 10-2013-0136478 A | 12/2013 |
| KR | 10-2014-0004069 A | 1/2014 |
| KR | 10-2014-0016236 A | 2/2014 |
| WO | WO 2012/057164 A1 | 5/2012 |
| WO | WO 2012/111755 A1 | 8/2012 |

OTHER PUBLICATIONS

Digital Video Broadcasting (DVB), "Digital Video Broadcasting (DVB); Plano-Stereoscopic 3DTV; Part 2: Frame Compatible Plano-Stereoscopic 3DTV," ETSI TS 101 547-2, V1.2.1, XP014092667, Nov. 2012, pp. 1-26.
International Telecommunication Union ITU-T, "Advanced Video Coding for Generic Audiovisual Services, Series H: Audiovisual and Multimedia Systems Infrastructure of Audiovisual Services—Coding of Moving Video," Telecommunication Standardization Sector of ITU, H.264, XP055232958 Apr. 2013 pp. 1-708 (732 pages total).

* cited by examiner

FIG. 5
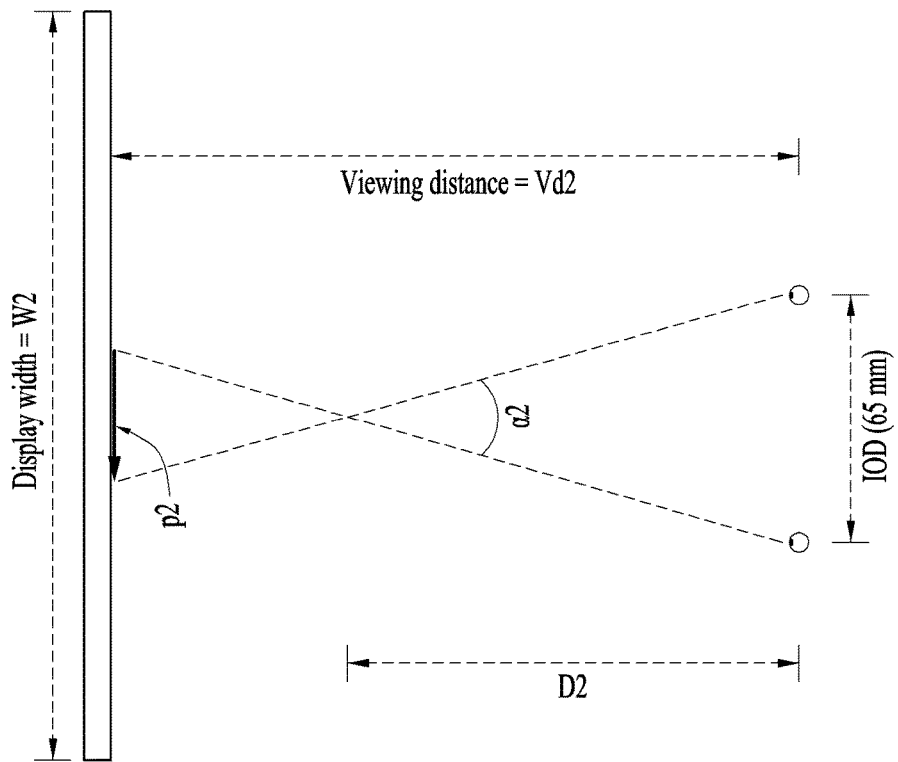
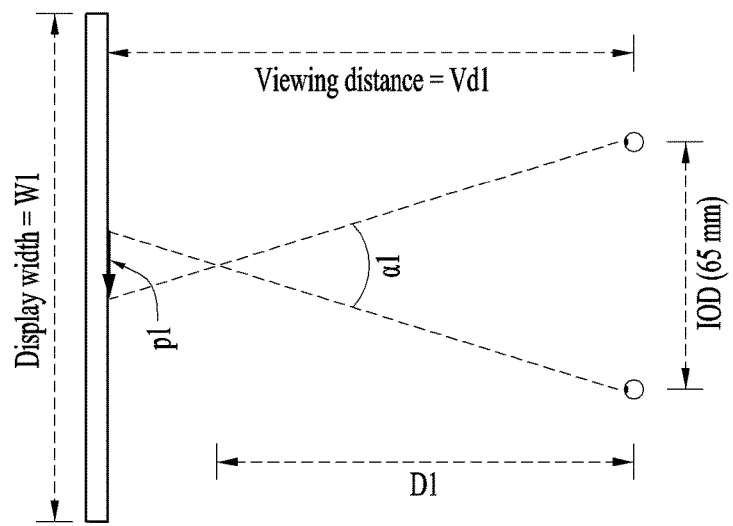

| Screen size | The number of pixels required to indicate unlimited 3D effect |
|---|---|
| 14inches | 402.7 |
| 23inches | 245.1 |
| 32inches | 176.2 |
| 42inches | 134.2 |
| 52inches | 108.4 |

FIG. 13

| Syntax | Format |
|---|---|
| Stereo_3D_rendering_info descriptor ( ) { | |
| descriptor_tag | u(8) |
| descriptor_length | u(8) |
| view_pair_ID | u(8) |
| target_parameter_valid_flag | u(4) |
| reserved | '1111' |
| target_display_size | u(8) |
| target_IOD | u(8) |
| target_viewing_distance | u(8) |
| rendered_param ( ) | |
| num_of_references | u(8) |
| for (j=0; j< num_of_references; j++) { | |
| ref_parameter_valid_flag | u(4) |
| compensation_type | u(4) |
| ref_display_size | u(8) |
| ref_IOD | u(8) |
| ref_viewing_distance | u(8) |
| ref_compensation_param ( ) | |
| } | |
| } | |

FIG. 14

| compensation_type | Maintaining factors |
|---|---|
| 0x00 | Vergence angle |
| 0x01 | Parallax angle |
| 0x02 | Distance range (based on viewer position) |
| 0x03 | Distance range (based on screen position) |
| 0x04 | Reserved |
| 0x05 | Reserved |
| 0x06 | Reserved |
| 0x07 | Reserved |

FIG. 15

| Syntax | Format |
|---|---|
| view_pair_descriptor ( ) { | |
|    descriptor_tag | u(8) |
|    descriptor_length | u(8) |
|    num_of_view_pairs | u(8) |
|    for (j=0; j< num_of_view_pairs; j++) { | |
|      view_pair_ID | u(8) |
|      left_PID | u(13) |
|      right_PID | u(13) |
|      reserved | '111111' |
|    } | |
| } | |

FIG. 16

```
PMT

......
program_number = 0x0002
 stereo_3D_rendering_info _descriptor (option 1)
 view_pair_descriptor
......
      stream_type = 0x1B (AVC video, View 1)
      elementary_PID = 0x0090
      stereo_3D_rendering_info _descriptor (option 3)
......
      stream_type = 0x20 (MVC extension, View 2)
      elementary_PID = 0x00A0
      stereo_3D_rendering_info _descriptor (option 3)
......
      stream_type = 0x26 (depth stream, View 1)
      elementary_PID = 0x0091
      stereo_3D_rendering_info _descriptor (option 2)
......
      stream_type = 0x26 (depth stream, View 2)
      elementary_PID = 0x00A1
      stereo_3D_rendering_info _descriptor (option 2)
......
```

FIG. 18

| Syntax | Number of bits | Identifier |
|---|---|---|
| service_description_section ( ) { | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     transport_stream_id | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     original_network_id | 16 | uimsbf |
|     reserved_future_use | 8 | bslbf |
|     for (i=0; i< N; i++) { | | |
|         service_id | 16 | uimsbf |
|         reserved_future_use | 6 | bslbf |
|         EIT_schedule_flag | 1 | bslbf |
|         EIT_present_following_flag | 1 | bslbf |
|         running_status | 3 | uimsbf |
|         free_CA_mode | 1 | bslbf |
|         descriptors_loop_length | 12 | uimsbf |
|         for (j=0; j<N; j++) { | | |
|             descriptor( ) | | |
|         } | | |
|     } | | |
|     CRC_32 | 32 | rpchof |
| } | | |

Position of stereo 3D rendering info and view pair descriptor

FIG. 19

| Syntax | Number of bits | Format |
|---|---|---|
| user_data_registered_itu_t_t35 ( ) { | | |
|     itu_t_t35_country_code | 8 | bslbf |
|     itu_t_t35_provider_code | 16 | bslbf |
|     user_identifier | 32 | bslbf |
|     user_structure( ) | | |
| } | | |

FIG. 20

| user_identifier | user_structure( ) |
|---|---|
| 0x47413934 ('GA94') | DVB1_data ( ) |
| 0x44544731 ('DTG1') | afd_data ( ) |

FIG. 21

| Syntax | Number of bits | Identifier |
|---|---|---|
| DVB1_data ( ) { | | |
|     user_data_type_code | 8 | uimsbf |
|     user_data_type_structure( ) | | |
| } | | |

FIG. 22

| Syntax | Format |
|---|---|
| Stereo_3D_rendering_info_data ( ) { | |
|   stereo_3D_rendering_info_id | u(v) |
|   stereo_3D_rendering_info_cancel_flag | u(1) |
|   if (stereo_3D_rendering_info_cancel_flag = '0') { | |
|     view_pair_id | u(8) |
|     target_parameter_valid_flag | u(4) |
|     reserved | '1111' |
|     target_display_size | u(8) |
|     target_IOD | u(8) |
|     target_viewing_distance | u(8) |
|     rendered_param () | |
|     num_of_references | u(8) |
|     for (j=0; j< num_of_references; j++) { | |
|       ref_parameter_valid_flag | u(4) |
|       compensation_type | u(4) |
|       ref_display_size | u(8) |
|       ref_IOD | u(8) |
|       ref_viewing_distance | u(8) |
|       ref_compensation_param ( ) | |
|     } | |
|   } | |
| } | |

FIG. 23

| Syntax | Number of bits | Format |
|---|---|---|
| stereo_3D_rendering_info_SEI_descriptor ( ) { | | |
|   descriptor_tag | 8 | 0xTBD |
|   descriptor_length | 8 | uimsbf |
|   reserved | 6 | '111111' |
|   stereo_3D_rendering_info_SEI_message_exist_flag | 1 | bslbf |
| | | |
| } | | |

Video element for view 1- view applied to all receivers (2D and 3D)
Video element for view 2-32" - view applied to receiver having screen size of 32inches
Video element for view 2-42" - view applied to receiver having screen size of 42inches
Video element for view 2-52" - view applied to receiver having screen size of 52inches

FIG. 25

| Type of channel | In-band (3D channel / 2D channel) | Broadband / Other channel (additional view video elements) |
|---|---|---|
| signaling method | - PMT program level<br>- TVCT channel level<br>- SDT service level<br>- EIT event level<br>- Video header in additional view video element (SEI message 등) | - case of broadband<br>  · IP layer signaling<br>  · video level signaling<br>- case of other channel<br>  · PMT program level<br>  · TVCT channel level<br>  · SDT service level<br>  · EIT event level<br>  · Video header in additional view video element (SEI message, etc.) |
| service configuration elements | - Base view + additional view video elements (3D channel)<br>- Base view video only (2D channel) | - Only additional view video element |
| signaling contents | - target display condition parameter (viewing distance, display size, IOD, etc.) for base + additional view video element combination – skip in case of 2D channel<br>- condition information for virtual view point that has no video data but can be rendered with view synthesis<br>- signaling information (IP address, ED PID, schedule information, etc.) for additional view video element that can be received by out-of-band (broadband, etc.) | - signaling information for base view (channel, PID, etc.)<br>- condition information for virtual view point that has no video data but can be rendered with view synthesis can be included – see embodiment of Table 7<br>- field is configured to allow legacy TV not to receive corresponding element (hidden channel, unknown service type, etc.) |

FIG. 26

| Syntax | Format |
|---|---|
| Stereo_3D_viewing_condition_info descriptor ( ) { | |
|     descriptor_tag | 8 |
|     descriptor_length | u(8) |
|     base_channel_number | u(20) |
|     base_program_number | u(16) |
|     base_source_id | u(16) |
|     base_network_id | u(16) |
|     base_PID | u(13) |
|     num_of_views | u(8) |
|     reserved | '1111111' |
|     for (j=0; j< num_of_views; j++) { | |
|         view_pair_ID | u(8) |
|         target_display_size | u(8) |
|         target_IOD | u(8) |
|         target_viewing_distance | u(8) |
|         rendered_param () | |
|     } | |
| } | |

FIG. 29
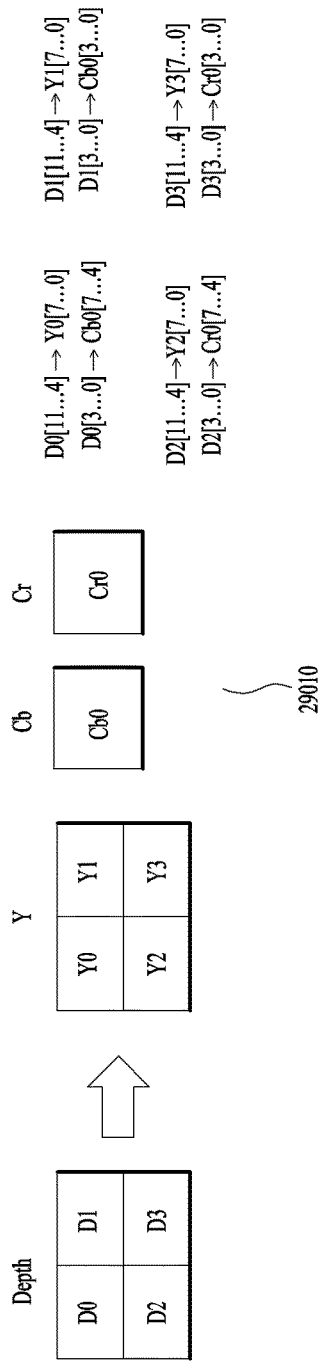
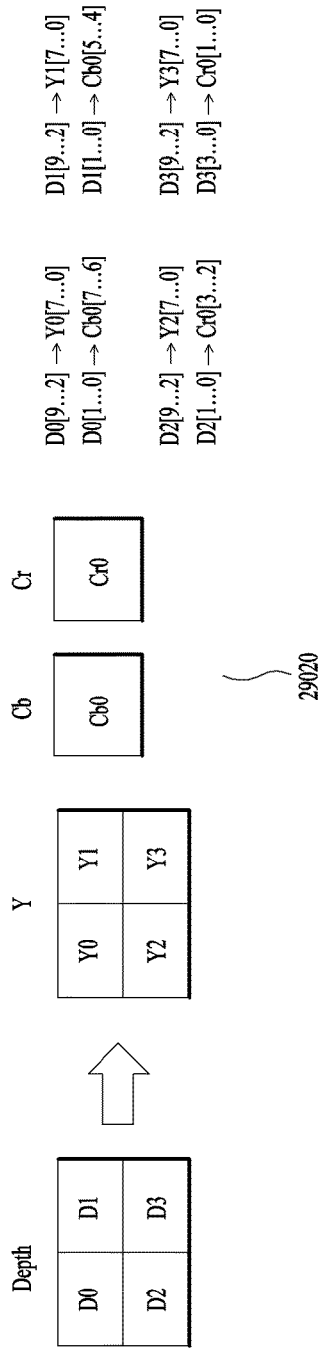

METHOD AND APPARATUS FOR TRANSMITTING/RECEIVING BROADCAST SIGNAL FOR 3-DIMENSIONAL (3D) BROADCAST SERVICE

CROSS REFERENCE TO RELATED APPLICATIONS

This application is the National Phase of PCT International Application No. PCT/KR2015/001323, filed on Feb. 10, 2015, which claims priority under 35 U.S.C. 119(e) to U.S. Provisional Application No. 61/938,087, filed on Feb. 10, 2014, all of which are hereby expressly incorporated by reference into the present application.

TECHNICAL FIELD

The present invention relates to transmission and reception of a broadcast signal, and more particularly, to a method and apparatus for transmitting and receiving a broadcast signal for 3-dimensional (3D) broadcast service.

BACKGROUND ART

The propagation and demand for audio/video oriented multimedia contents are rapidly expanding in various fields of Internet, personal media and the like as well as in fields of broadcasts and movies owing to the developments of the digital technology and the communication technology. As 3D TVs/movies providing 3D effect through broadcasts/movies are generalized, consumer's demands for Immersive Media providing reality and realism are increasing. Moreover, as a TV is equipped with a wide screen at home in addition to the development of a display technology, contents of high image quality amounting to HD or higher are increasingly enjoyed and consumed. To prepare for Post-HDTV markets, Realistic Broadcasting such as 3D TV or UHD (ultra high definition) TV is spotlighted as a next generation broadcasting service. Particularly, the ongoing discussions of UHD (ultra high definition) broadcasting service are increasingly rising.

Meanwhile, popularization of 3-dimensional television (3DTV) activates not only supply of 3D video contents according to storage media but also transmission of 3D video contents according to digital broadcast.

Generally, a 3D image provides user's eyes with a stereoscopic (3D) effect using the stereoscopic visual principle of the eyes. A human being feels perspective through a binocular parallax caused by a distance between his or her eyes spaced apart from each other by about 65 mm, such that the 3D image enables both right and left eyes to respectively view associated planar images, resulting in the stereoscopic effect and the perspective effect.

Examples of a display method of the aforementioned 3D image may include a stereoscopic method, a volumetric method, a holographic method, etc. In case of the stereoscopic method, the 3D image display method provides a left view image to be viewed by the left eye and a right view image to be viewed by the right eye, such that the user's left eye views the left view image and the user's right eye views the right view image through either polarization glasses or a display device to allow the user to perceive the 3D image effect.

Meanwhile, if a broadcast receiver is capable of exactly reproducing the 3D effect that is intended by a 3D content producer, it may be the optimal image, however, depending upon the viewing condition, the 3D content that is configured of stereo images may actually display different 3D effects through the broadcast receiver. The current 3DTV receiver provides only limited 3D image that is fixed to a specific viewing condition. Therefore, the current viewers cannot fully and properly enjoy the 3D effect intended by the 3D content producer, thereby causing a disadvantage of distinctively degrading the viewers' level of satisfaction on 3D contents.

DISCLOSURE

Technical Problem

An object of the present invention devised to solve the aforementioned problem is to provide a broadcast receiver that provides a 3D effect intended by a 3D content producer during production of a corresponding content regardless of any change in a viewing condition of each viewer.

Moreover, another object of the present invention is to provide a method for efficiently transmitting and receiving 3D contents in a UHD broadcast transceiving system.

Technical Solution

A method for transmitting a broadcast signal according to one embodiment of the present invention may comprise the steps of: downsampling each of a left view frame, a right view frame, a depth view frame for a left view and a depth view frame for a right view, and encoding a packing frame which packs at least one of the downsampled frames into one frame; generating a broadcast signal comprising signaling information for the encoded packing frame and a view related to the packing frame; and transmitting the generated broadcast signal.

Preferably, the packing frame may be generated by mapping depth information included in the depth view frame for the left view and depth information included in the depth view frame for the right view into color spatial components indicating the packing frame in a bit unit.

Preferably, the signaling information may include frame packing arrangement information indicating that the frame included in the broadcast signal is a packing frame.

Preferably, the signaling information may include depth bit depth information indicating a bit depth of depth information included in the depth view frame for the left view and depth information included in the depth view frame for the right view.

Preferably, the signaling information may include frame flipping flag information indicating that the left view frame and the right view frame have been flipped horizontally.

Preferably, the signaling information may include a supplemental enhancement information (SEI) message, and at least one of the frame packing arrangement information, the depth bit depth information and the frame flipping flag information is included in an SEI message within a video stream that includes the packing frame.

Preferably, the signaling information may include a program map table (PMT), and the PMT may include frame packing flag information indicating whether the frame packing arrangement information is included in the SEI message.

Preferably, at least one of the frame packing arrangement information, the depth bit depth information and the frame flipping flag information may be signaled at a system level.

A method for receiving a broadcast signal according to another embodiment of the present invention may comprise the steps of receiving a broadcast signal comprising a packing frame which packs at least one of a left view frame, a right view frame, a depth view frame for a left view and a depth view frame for a right view in one frame and signaling information on a view related to the packing frame; extracting at least one of the left view frame, the right view frame, the depth view frame for the left view and the depth view frame for the right view from the received packing frame; and rendering a 3D view by using the extracted at least one frame.

Preferably, the packing frame may be generated by mapping depth information included in the depth view frame for the left view and depth information included in the depth view frame for the right view into color spatial components indicating the packing frame in a bit unit.

Preferably, the signaling information may include frame packing arrangement information indicating that the frame included in the broadcast signal is a packing frame.

Preferably, the signaling information may include depth bit depth information indicating a bit depth of depth information included in the depth view frame for the left view and depth information included in the depth view frame for the right view.

Preferably, the signaling information may include frame flipping flag information indicating that the left view frame and the right view frame have been flipped horizontally.

Preferably, the signaling information may include a supplemental enhancement information (SEI) message, and at least one of the frame packing arrangement information, the depth bit depth information and the frame flipping flag information may be included in an SEI message within a video stream that includes the packing frame.

Preferably, the signaling information may include a program map table (PMT), and the PMT may include frame packing flag information indicating whether the frame packing arrangement information is included in the SEI message.

Preferably, at least one of the frame packing arrangement information, the depth bit depth information and the frame flipping flag information may be signaled at a system level.

An apparatus for transmitting a broadcast signal according to another embodiment of the present invention comprises an encoder downsampling each of a left view frame, a right view frame, a depth view frame for a left view and a depth view frame for a right view, and encoding a packing frame which packs at least one of the downsampled frames into one frame; a broadcast signal generator generating a broadcast signal comprising signaling information for the encoded packing frame and a view related to the packing frame; and a transmitter transmitting the generated broadcast signal.

An apparatus for receiving a broadcast signal according to other embodiment of the present invention comprises a receiver receiving a broadcast signal comprising a packing frame packing at least one of a left view frame, a right view frame, a depth view frame for a left view and a depth view frame for a right view in one frame and signaling information on a view related to the packing frame; an extractor extracting at least one of the left view frame, the right view frame, the depth view frame for the left view and the depth view frame for the right view from the received packing frame; and a rendering module rendering a 3D view by using the extracted at least one frame.

Advantageous Effects

According to the present invention, a 3D effect intended by a 3D content producer during production of a corresponding content may be provided to a viewer regardless of any change in a viewing condition of each viewer.

According to the present invention, a 3D effect intended by a 3D content producer during production of a corresponding content may be provided to a viewer while a broadcast system of the present invention is compatible with a conventional broadcast system structure.

According to the present invention, a 3D effect intended by a 3D content producer during production of a corresponding content may be provided to a viewer through minimum data processing of a receiver.

According to the present invention, a UHD broadcast transceiving system may efficiently transmit and receive 3D contents.

BRIEF DESCRIPTION OF THE DRAWINGS

FIG. 5 is a diagram illustrating a difference in 3D effects perceived depending on screen sizes according to one embodiment of the present invention.

FIG. 13 is a diagram illustrating a configuration of stereo_3D_rendering_info_descriptor( ) that includes stereo 3D rendering info( ) according to one embodiment of the present invention.

FIG. 14 is a diagram illustrating a configuration of compensation_type according to one embodiment of the present invention.

FIG. 15 is a diagram illustrating a configuration of view_pair_descriptor( ) according to one embodiment of the present invention.

FIG. 16 is a diagram illustrating a configuration of a program map table (PMT) according to one embodiment of the present invention.

FIG. 18 is a diagram illustrating a configuration of a service description table (SDT) according to one embodiment of the present invention.

FIG. 19 is a diagram illustrating a configuration of user_data_registered_itu_t_t35( ) according to another embodiment of the present invention.

FIG. 20 is a diagram illustrating a user_identifier value used for DVB and user_structure( ) corresponding to the user_identifier value according to one embodiment of the present invention.

FIG. 21 is a diagram illustrating a configuration of DVB1_data( ) according to one embodiment of the present invention.

FIG. 22 is a diagram illustrating a configuration of an SEI message that includes stereo 3D rendering info according to one embodiment of the present invention.

FIG. 23 is a diagram illustrating a configuration of stereo_3D_rendering_info_SEI_descriptor( ) according to one embodiment of the present invention.

FIG. 25 is a diagram illustrating that signaling methods and signaling contents of a broadcast service according to one embodiment of the present invention are identified depending on types of a transport channel.

FIG. 26 is a diagram illustrating a configuration of stereo_3D_viewing_condition_info_descriptor( ) according to one embodiment of the present invention.

FIG. 29 is a diagram illustrating a method for mapping a depth map into a 8-bit 4K frame in accordance with one embodiment of the present invention.

BEST MODE FOR CARRYING OUT THE INVENTION

Hereinafter, although the embodiments of the present invention will be described in detail with reference to the accompanying drawings and the disclosure described by the drawings, it is to be understood that the present invention is not limited by such embodiments.

Although the terms used in this specification are selected from generally known and used terms considering their functions in the present invention, the terms may be modified depending on intention of a person skilled in the art, practices, or the advent of new technology. Also, in special case, the terms mentioned in the description of the present invention may be selected by the applicant at his or her discretion, the detailed meanings of which are described in relevant parts of the description herein. Accordingly, the terms used herein should be understood not simply by the actual terms used but by the meaning lying within and the description disclosed herein.

Figure 1:
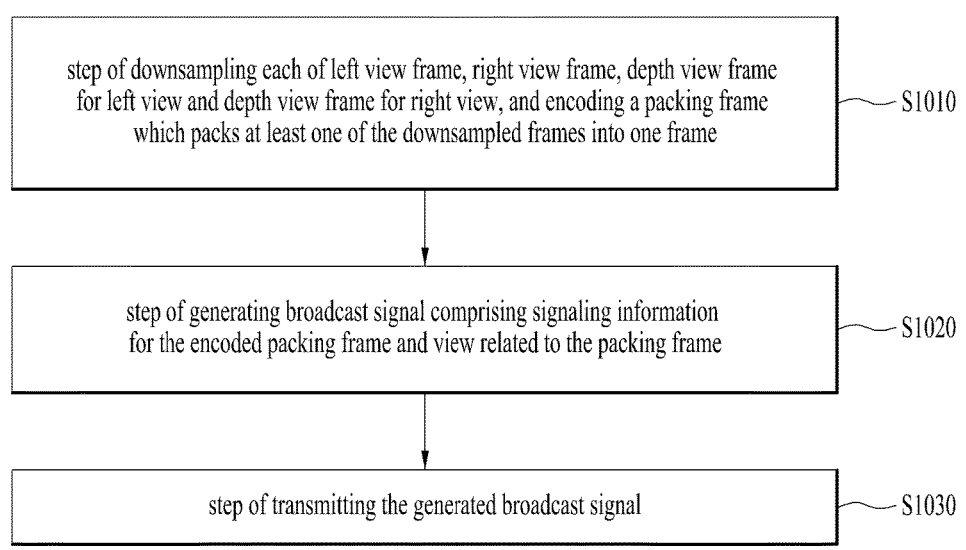
FIG. 1 is a diagram illustrating a method for transmitting a broadcast signal according to one embodiment of the present invention.

FIG. 1 is a diagram illustrating a method for transmitting a broadcast signal according to one embodiment of the present invention.

The method for transmitting a broadcast signal according to one embodiment of the present invention may comprise the step S1010 of downsampling each of a left view frame, a right view frame, a depth view frame for a left view and a depth view frame for a right view and encoding a packing frame obtained by packing at least one of the downsampled frames in one frame, the step S1020 of generating a broadcast signal including the encoded packing frame and signaling information on an image related to the packing frame, and/or the step S1030 of transmitting the generated broadcast signal.

An encoder according to one embodiment of the present invention may respectively downsample a left view frame, a right view frame, a depth view frame for a left view and a depth view frame for a right view and encode a packing frame obtained by packing at least one of the downsampled frames in one frame. In this case, the encoder may generate a left view, a right view, a depth view for the left view and/or a depth view for the right view, and may perform frame packing for inserting the views into one frame. According to another embodiment of the present invention, a left view frame, a right view frame, a depth view frame for a left view and/or a depth view frame for a right view may be packed in one frame without being downsampled, and a detailed description thereof will be described later with reference to FIG. 28.

A broadcast signal generator according to one embodiment of the present invention may generate a broadcast signal that includes an encoded packing frame and signaling information on a view related to the packing frame. In this case, the broadcast signal generator corresponds to a hardware and may include a modulator. A detailed description of the broadcast generator will be described later with reference to FIG. 28.

A transmitter according to one embodiment of the present invention may transmit the generated broadcast signal. The transmitter may transmit the broadcast signal through a terrestrial broadcast network, a cable network and/or a broadband. A detailed description of the transmitter will be described later with reference to FIGS. 25 and 28.

According to another embodiment of the present invention, the packing frame may be generated by mapping depth information included in the depth view frame for the left view and depth information included in the depth view frame for the right view into color spatial components indicating the packing frame in a bit unit. A detailed description of the packing frame will be described later with reference to FIG. 29.

According to another embodiment of the present invention, the signaling information may include frame packing arrangement information indicating that a frame included in the broadcast frame is a packing frame. A detailed description of the signaling information will be described later with reference to FIG. 28.

According to still another embodiment of the present invention, the signaling information may include frame flipping flag information indicating whether the left view frame and the right view frame have been flipped horizontally. A detailed description of the signaling information will be described later with reference to FIG. 28.

According to further still another embodiment of the present invention, the signaling information may include supplemental enhancement information (SEI) message, and at least one of the frame packing arrangement information, the depth bit depth information and the frame flipping flag information may be included in the SEI message within a video stream that includes the packing frame. A detailed description of the signaling information and the other information will be described later with reference to FIGS. 19, 20, 21 and 28.

According to further still another embodiment of the present invention, the signaling information may include a program map table (PMT), and the PMT may include frame packing flag information indicating whether the frame packing arrangement information is included in the SEI message. A detailed description of the signaling information and the PMT will be described later with reference to FIGS. 16, 19, 20, 21 and 28.

According to further still another embodiment of the present invention, at least one of the frame packing arrangement information, the depth bit depth information and the frame flipping flag information may be signaled at a system level. A detailed description of the signaled information will be described later with reference to FIGS. 25 and 28.

Figure 2:
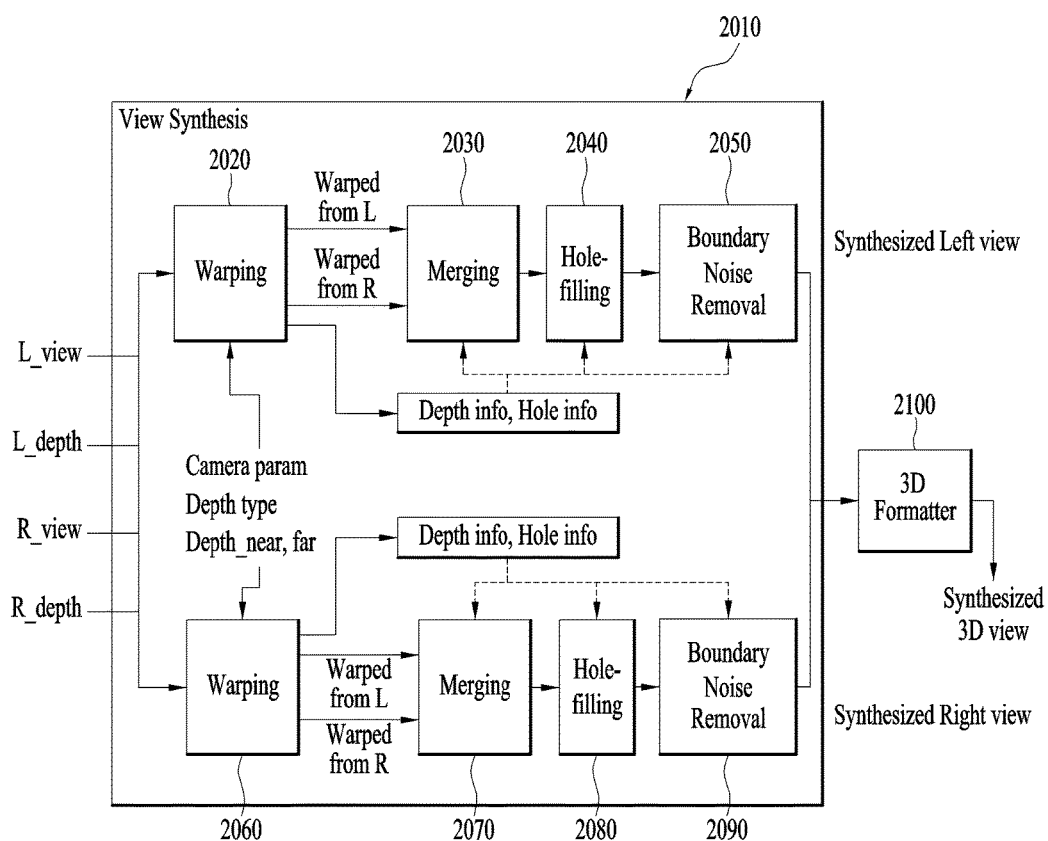
FIG. 2 is a diagram illustrating a configuration of a view synthesis module according to one embodiment of the present invention.

FIG. 2 illustrates a view synthesis module according to one embodiment of the present invention.

According to one embodiment of the present invention, if two new views are generated to output a 3D view of a random time as shown, each view and depth map may be subjected to a procedure of four steps, which will be described later. In this case, related information such as camera parameters, depth type, depth near, and depth far may be provided to process each view and/or depth map.

A viewing synthesis module 2010 according to one embodiment of the present invention may include a first warping module 2020, a first merging module 2030, a first hole-filling module 2040, a first boundary noise removal module 2050, a second warping module 2060, a second merging module 2070, a second hole-filling module 2080, a second boundary noise removal module 2090, and/or a 3D formatter 2100.

The warping module may warp a left view L_view, a left depth L_depth, a right view R_view and a right depth R_depth, which are input to the view synthesis module. The warping module may generate data warped from left data L by warping the left view and the left depth and generate data warped from right data R by warping the right view and the right depth. In this case, the left data may include a left view and a left depth while the right data may include a right view and a right depth. The warping module may warp the left view L_view, the left depth L_depth, the right view R_view and the right depth R_depth on the basis of camera parameter information, depth type information, depth_near information, and/or depth_far information. The camera parameter information may include information on cameras at a place where 3D content is being produced. The depth type information is a disparity value of objects included in the left view and/or right view, and may provide depth information. In this case, disparity indicates a horizontal difference between points respective to each of the left view and the right view for indicating the same point of a 3D image, and the difference may be indicated by a picture unit. In this case, the left view may be referred to as a left image, and the right view may be referred to as a right image. The warping module may provide depth info and/or hole info to the merging module, the hole-filling module and/or the boundary noise removal module. The warping module may include the first warping module and the second warping module.

The merging module may merge the data warped from the left data and the data warped from the right data by the warping module. The merging module may use depth info and/or hole info provided by the warping module. The merging module may include the first merging module and/or the second merging module.

The hole-filling module may fill a hole of the data merged by the merging module. The hole-filling module may use depth info and/or hole info provided by the warping module. The hole-filling module may include the first hole-filling module and/or the second hole-filling module.

The boundary noise removal module may generate a synthesized left view and/or a synthesized right view by removing noise existing at a boundary of the data of which hole is removed by the hole-filling module. The boundary noise removing module may use depth info and/or hole info provided by the warping module. The boundary noise removal module may include the first boundary noise removal module and/or the second boundary noise removal module.

The 3D formatter may generate a synthesized 3D view of a random time by using the synthesized left view and/or the synthesized right view generated by the boundary noise removal module.

Figure 3:
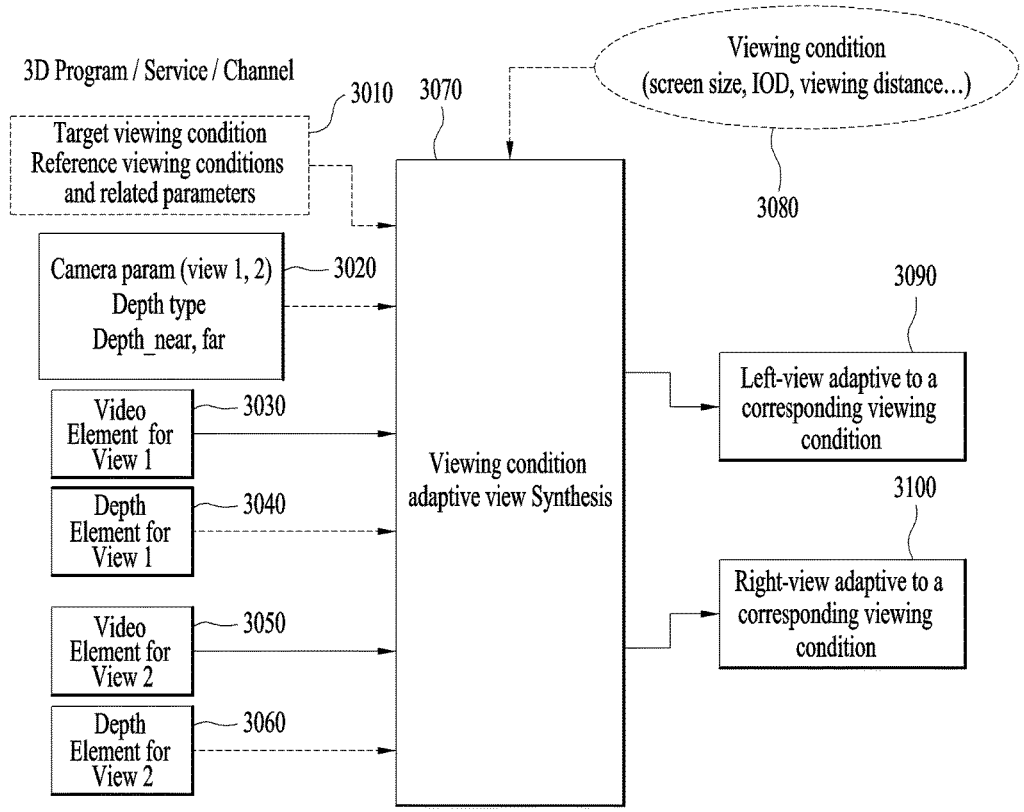
FIG. 3 is a diagram illustrating a procedure of generating a stereo view adaptive to a viewing condition according to one embodiment of the present invention.

FIG. 3 is a diagram illustrating a procedure of generating a stereo view adaptive to a viewing condition according to one embodiment of the present invention.

According to one embodiment of the present invention, if a receiver selects its own random view and applies view synthesis thereto, rendering may be performed by using basic information required for the view synthesis (e.g., camera parameter information, depth type information, depth_near information, and/or depth_far information). However, in one embodiment of the present invention, it is not possible to provide a 3D view adaptive to the viewing condition by using only the aforementioned basic information required for the view synthesis.

According to another embodiment of the present invention, a 3D view adaptive to the viewing condition may be provided by using information (target viewing condition) on a specific viewing condition, to which the currently received stereo image is being targeted, and guideline information (reference viewing conditions and related parameters) corresponding to a case when another reference viewing condition is to be supported, and/or information on a viewing condition as well as the aforementioned basic information required for the view synthesis.

As shown, the viewing condition adaptive view synthesis module 3070 according to one embodiment of the present invention may generate a left-view 3090 adaptive to a corresponding viewing condition, and/or a right-view 3100 adaptive to a corresponding viewing condition by using a video element 3030 for view 1, a depth element 3040 for view 1, a video element 3050 for view 2, a depth element 3060 for view 2), basis information 3020 required for view synthesis (camera parameters (camera param (view 1, 2) for view 1 and/or view 2) depth type, depth_near, depth_far), target viewing condition information 3010, reference viewing conditions information 3010, reference viewing condition related parameters 3010 and/or viewing condition information 3080. In this case, the target viewing condition information 3010, the reference viewing conditions information 3010 and/or the reference viewing condition related parameters 3010 may be provided from the transmitter. The viewing condition information 3080 may be acquired from the receiver. The viewing condition may include information on a screen size, an IOD (inter ocular distance) and a viewing distance.

Figure 4:
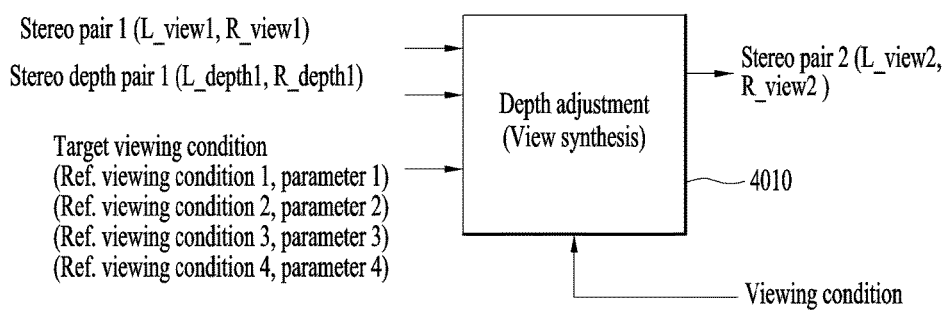
FIG. 4 is a diagram illustrating an operation of a receiver for providing a viewing condition adaptive stereo view according to one embodiment of the present invention.

FIG. 4 is a diagram illustrating an operation of a receiver for providing a viewing condition adaptive stereo view according to one embodiment of the present invention.

The view synthesis module 4010 (depth adjustment) may generate a stereo pair 2 (L_view2, R_view2) by receiving a stereo pair 1 (L_view1, R_view1), a stereo depth pair 1 (L_depth1, R_depth1), a target viewing condition and/or a viewing condition. In this case, the stereo pair 1 may include L_view1 and/or R_view1. The stereo depth pair 1 may include L_depth1 and/or R_depth1. The stereo pair 2 may include L_view2 and/or R_view2. The target viewing condition may include a reference viewing condition 1 (Ref. viewing condition 1), a parameter 1, a reference viewing condition 2 (Ref viewing condition 2), a parameter 2, a reference viewing condition 3 (Ref viewing condition 3), a parameter 3, a reference viewing condition 4 (Ref. viewing condition 4) and/or a parameter 4. The target viewing condition may include more reference viewing conditions and parameters corresponding to the reference viewing conditions. In this case, the parameter 1 to the parameter 4 may indicate parameters corresponding to the respective viewing conditions. For example, the parameter 1 may correspond to the reference viewing condition 1. In this case, the view synthesis module may be included in the receiver according to one embodiment of the present invention.

The receiver according to one embodiment of the present invention may output the received stereo pair 1 without performing additional depth adjustment if the viewing condition stored in the receiver or input thereto is matched with the target viewing condition of the stereo pair 1. At this time, the stereo pair 2 may be the same as the stereo pair 1. The target viewing condition may indicate the viewing condition of the stereo pair 1.

The receiver according to one embodiment of the present invention may search for the received reference viewing conditions to identify whether there is the received reference viewing condition matched with the viewing condition if the viewing condition stored in the receiver or input thereto is not matched with the target viewing condition. If there is the received reference viewing condition matched with the viewing condition, the receiver may perform depth adjustment with reference to a parameter value corresponding to the matched reference viewing condition and acquire and output a new stereo pair. If there is no the received reference viewing condition matched with the viewing condition, the receiver may generate the stereo pair 2 by calculating a proper parameter value with reference to the most similar condition of the received reference viewing conditions or the received reference viewing conditions. This will be described later in detail.

FIG. 5 is a diagram illustrating a difference in 3D effects perceived depending on screen sizes according to one embodiment of the present invention.

According to one embodiment of the present invention, the viewing condition is a main element, and may include a screen size, an inter ocular distance (IOD) and/or a viewing distance. A 3D effect of the same content may be perceived differently depending on the aforementioned elements.

According to one embodiment of the present invention, as the screen size becomes smaller, a depth budget for displaying the same 3D effect becomes larger, and, conversely, as the screen size becomes larger, the depth budget for displaying the same 3D effect may be consumed less.

As shown, if the same stereo content is output to different screen sizes, a depth which is perceived may be varied depending on a corresponding parallax and viewing distance.

According to one embodiment of the present invention, in order to determine the variation in the depth (or 3D effect) respective to each screen size, a comparison may be made between the numbers of pixels corresponding to the IOD. On the display screen, a depth (3D effect) corresponding to the parallax of the IOD(=65 mm) corresponds to an unlimited depth sinking to the back of the screen, and a depth corresponding to the parallax of IOD (=0 mm) may refer to a depth corresponding to the surface of the screen. A depth corresponding to the parallax of the other IOD may indicate a 3D effect varied depending on the screen size. In this case, the depth may be used to refer to the 3D effect.

Figures 6, 7:
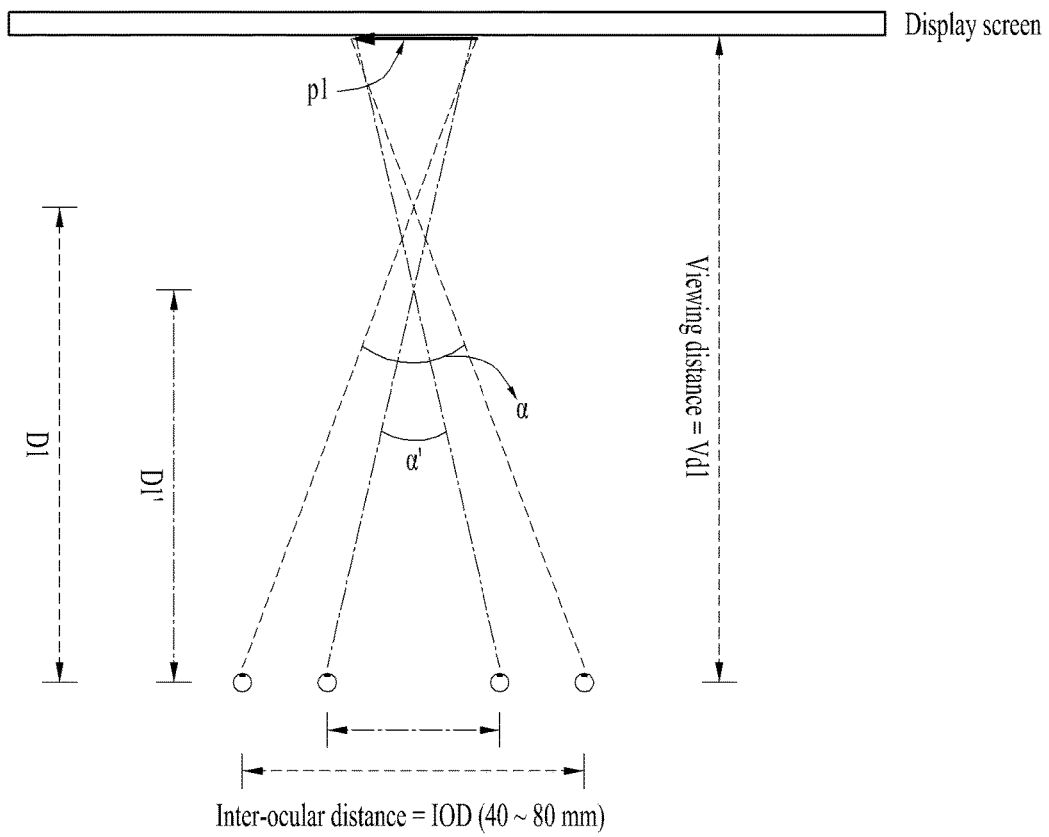
FIG. 6 is a diagram illustrating the number of pixels corresponding to IOD per screen size according to one embodiment of the present invention.
FIG. 7 is a diagram illustrating a difference in 3D effects perceived depending on a length of IOD according to one embodiment of the present invention.

FIG. 6 is a diagram illustrating the number of pixels corresponding to IOD per screen size according to one embodiment of the present invention.

According to one embodiment of the present invention, FIG. 6 illustrates the number of pixels corresponding to 65 mm IOD in a stereo view comprised of a left view and a right view at resolution of 1920*1080 (full HD). As shown, when comparison is made between pixel numbers corresponding to IOD for each of diverse screen sizes, it is noted that the number of pixels of a disparity for displaying the same 3D effect is varied depending on the screen sizes.

As shown, if the screen size is 14 inches, 402.7 pixels are required to display an unlimited 3D effect, and if the screen size is 23 inches, 245.1 pixels are required to display an unlimited 3D effect. Likewise, if the screen size is 32 inches, 176.2 pixels are required, and if the screen size is 52 inches, 108.4 pixels are required.

FIG. 7 is a diagram illustrating a difference in 3D effects perceived depending on a length of IOD according to one embodiment of the present invention.

According to one embodiment of the present invention, the stereo 3D effect may be varied depending on the length of the IOD. For example, if a viewer is a child, the IOD may generally be small, and the depth budget that is required for perceiving the same 3D effect may also be small, and, conversely, if the viewer is an adult having a larger IOD as compared to a child, the depth budget that is required for perceiving the same 3D effect may be larger than that of a child.

As shown in FIG. 6, a depth D1, D1' that is perceived with respect to the same parallax p1 may be varied depending on various IDO values. D1 may indicate a depth perceived with respect to the parallax p1 when the IOD is 80 mm, and D1' may indicate a depth perceived with respect to the parallax p1 when the IOD is 40 mm.

According to one embodiment of the present invention, for a viewing distance respective to a 2D image, since a recommended viewing distance decided by the International telecommunication union (ITU)-R for each resolution exists, the transmitter and the receiver may set this as a reference standard. Conversely, in case of a stereo content (3D content), a difference may occur in a depth perceived in accordance with the viewing distance, and a reference standard respective to the viewing distance is not proposed. Therefore, the transmitter may transmit information on a viewing distance, which is set as a reference standard, to the receiver.

As described above, a 3D effect of a stereo content may be varied depending on the viewing condition, such as screen size, IOD, viewing distance, and so on. In one embodiment of the present invention, in order to appropriately deliver the 3D effect intended by the 3D content producer, a content adaptive to the aforementioned viewing condition may be provided. This will be described later in detail.

Figure 8:
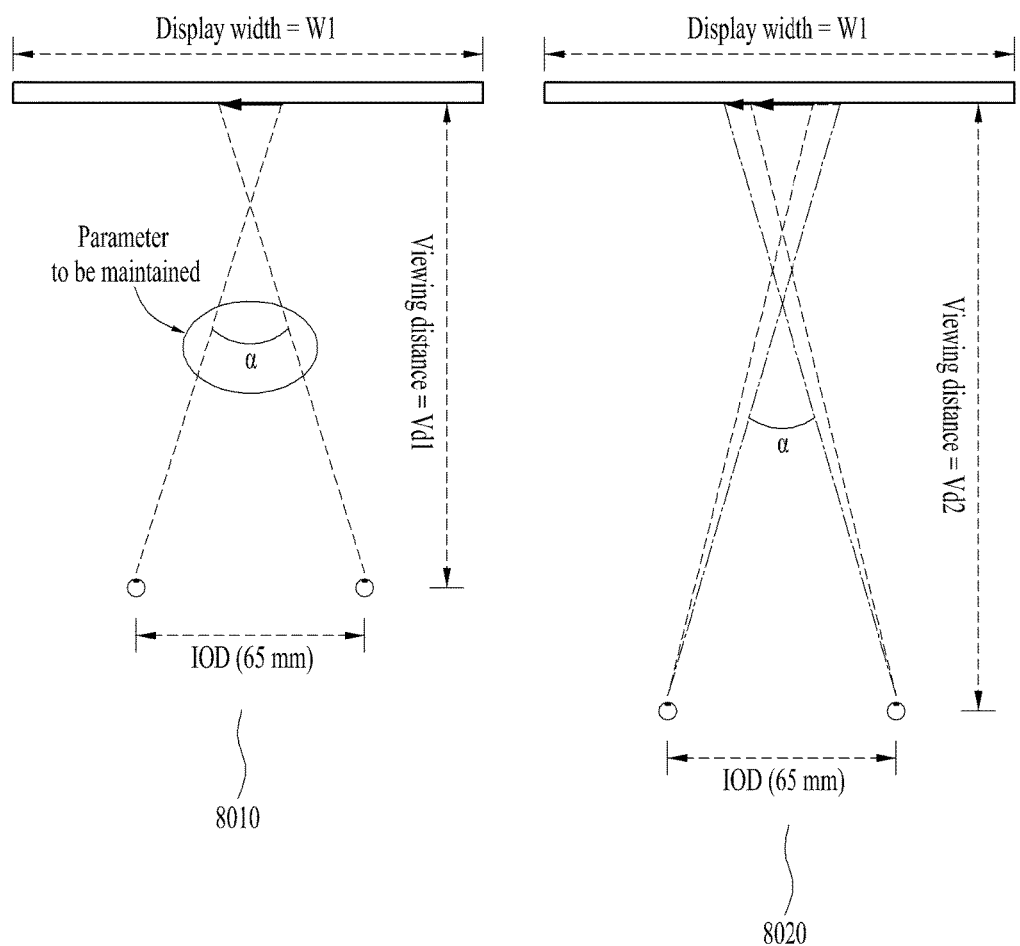
FIG. 8 is a diagram illustrating a compensation method for maintaining a 3D effect of a stereo image while uniformly maintaining a vergence angle in a state that a viewing distance is varied in accordance with one embodiment of the present invention.

FIG. 8 is a diagram illustrating a compensation method for maintaining a 3D effect of a stereo image while uniformly maintaining a vergence angle in a state that a viewing distance is varied in accordance with one embodiment of the present invention.

According to one embodiment of the present invention, when the 3D effect of the stereo image is to be maintained, various compensation methods may exist depending on one of elements constituting the viewing condition, which is intended to maintain the same value.

In the compensation method according to one embodiment of the present invention, since a difference may occur in an adjustment value depending on the element that is to be maintained, the receiver may perform compensation by using information on a compensation type. In this case, the information on the compensation type may include information as to an element on which is based to obtain the reference viewing condition and/or a reference compensation parameter corresponding to the reference viewing condition.

The compensation method according to one embodiment of the present invention may include a method for maintaining a vergence angle, a method for maintain a parallax angle, a method for maintaining a distance range based on a view, a method for maintaining a distance range based on a screen, and/or a method for maintaining a relative distance range. In this case, the parallax angle may indicate a difference value between an accommodation angle and a vergence angle. This will be described later in detail.

As shown, if a vergence angle is maintained on the condition that other viewing conditions are identical and the viewing distance becomes larger, an absolute value of the disparity (or parallax) may be increased to maintain a 3D effect of a stereo image in accordance with one embodiment of the present invention. Referring to FIG. 8, before (8010) or after (8020) compensation according to one embodiment of the present invention, the vergence angle (alpha) may be maintained, and as the viewing distance becomes larger (from Vd1 to Vd2), an absolute value of the disparity may be increased. At this time, the other viewing conditions such as display width w1, IOD (65 mm), etc. may be identical.

Although not shown, if the vergence angle is maintained on the condition that the other viewing conditions are identical and screen size becomes larger, an absolute value of the disparity may be reduced to maintain the 3D effect of the stereo image in accordance with one embodiment of the present invention. At this time, the parallax may be maintained as it is. Although not shown, if the vergence angle is maintained on the condition that the other viewing conditions are identical and IOD only becomes larger, an absolute value of the disparity (parallax) may be reduced to maintain the 3D effect of the stereo image in accordance with one embodiment of the present invention.

Figure 9:
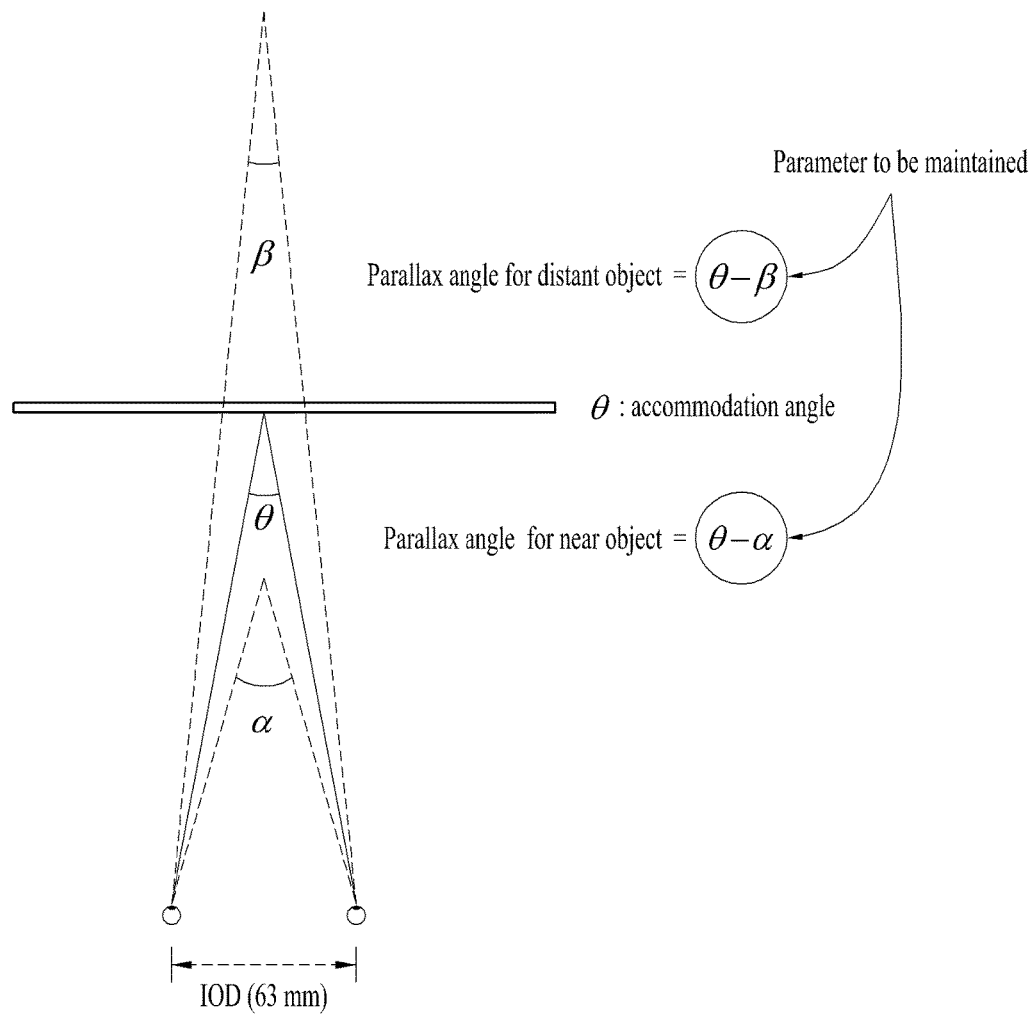
FIG. 9 is a diagram illustrating a parallax angle used for a compensation method for maintaining a 3D effect of a stereo image while uniformly maintaining the parallax angle in accordance with one embodiment of the present invention.

FIG. 9 is a diagram illustrating a parallax angle used for a compensation method for maintaining a 3D effect of a stereo image while uniformly maintaining the parallax angle in accordance with one embodiment of the present invention.

The parallax angle (theta-beta) according to one embodiment of the present invention may indicate a difference value between an accommodation angle (theta) and a vergence angle (alpha, beta). In this case, the accommodation angle may indicate a binocular disparity angle with respect to a size. The vergence angle may indicate a binocular disparity angle with respect to an object.

According to one embodiment of the present invention, if the parallax angle is maintained on the condition that the other viewing conditions are identical and the viewing distance becomes larger, an absolute value of the disparity (parallax) may be increased to maintain the 3D effect of the stereo image in accordance with one embodiment of the present invention. At this time, a maximum disparity value with respect to a viewing distance of 4 m or more may not be changed. Also, if the parallax angle is maintained on the condition that the other viewing conditions are identical and the screen size becomes larger, an absolute value of the disparity (parallax) may be reduced to maintain the 3D effect of the stereo image in accordance with one embodiment of the present invention. At this time, the parallax may be maintained as it is. Also, if the parallax angle is maintained, the disparity (or parallax) may be maintained regardless of a change in the IOD size in accordance with one embodiment of the present invention.

Figure 10:
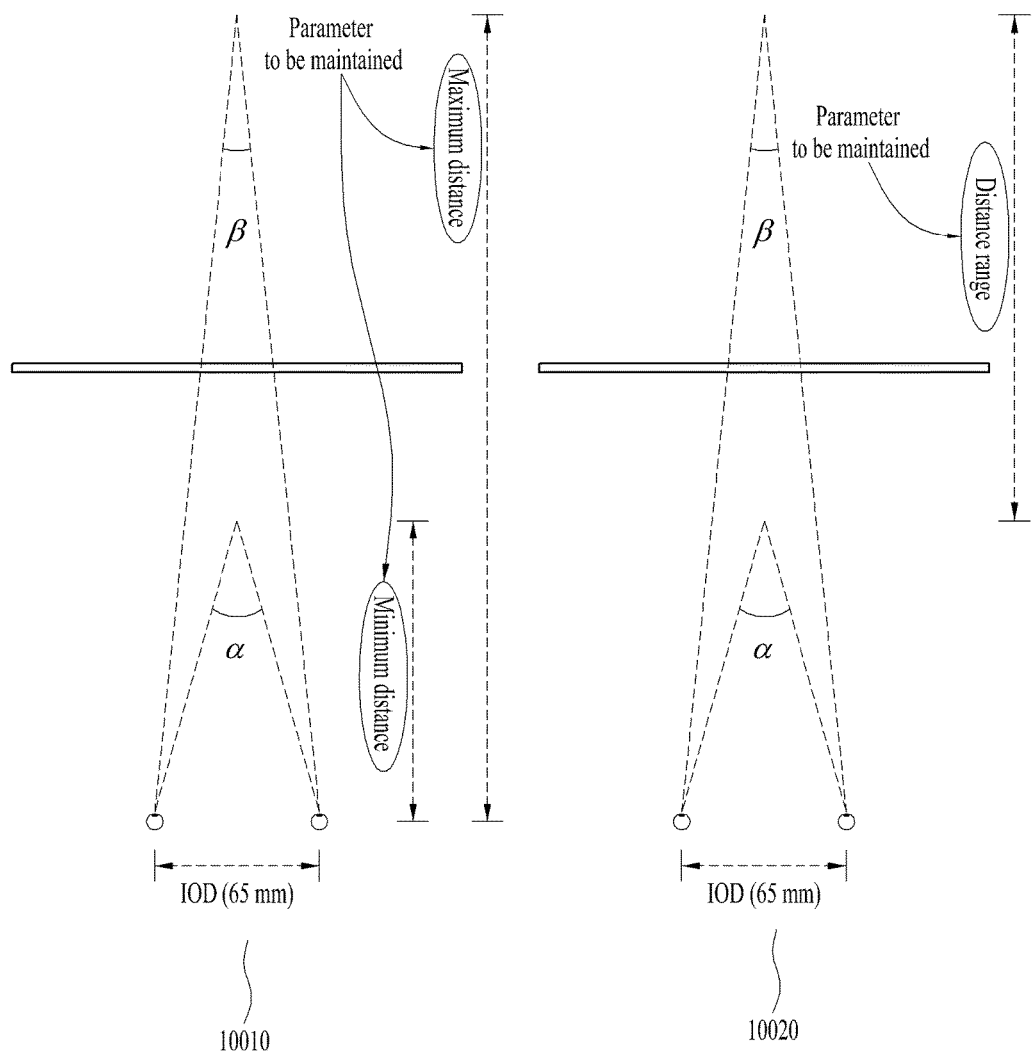
FIG. 10 is a diagram illustrating a distance range used for a compensation method for maintaining a 3D effect of a stereo image while uniformly maintaining the distance range in accordance with one embodiment of the present invention.

FIG. 10 is a diagram illustrating a distance range used for a compensation method for maintaining a 3D effect of a stereo image while uniformly maintaining the distance range in accordance with one embodiment of the present invention.

According to one embodiment of the present invention, a method 10010 for maintaining a distance range based on a viewer may mean a method for maintaining a target minimum distance Dmin (minimum distance) and a target maximum distance Dmax (maximum distance) even though a viewing condition is varied. In this case, the target minimum distance may indicate a maximum distance between a viewer and an object, and the target maximum distance may indicate a minimum distance between a viewer and an object.

In the method 10010 for maintaining a distance range based on a viewer, if the target minimum distance and the target maximum distance are maintained on the condition that the other viewing conditions are identical and the viewing distance becomes larger, an absolute value of the disparity (parallax) may be increased to maintain the 3D effect of the stereo image in accordance with one embodiment of the present invention. Also, if the target minimum distance and the target maximum distance are maintained on the condition that the other viewing conditions are identical and the screen size becomes larger, an absolute value of the disparity (parallax) may be reduced to maintain the 3D effect of the stereo image in accordance with one embodiment of the present invention. At this time, the parallax may be maintained as it is. Also, if the target minimum distance and the target maximum distance are maintained on the condition that the other viewing conditions are identical and the IOD becomes larger, an absolute value of the disparity (parallax) may be increased to maintain the 3D effect of the stereo image in accordance with one embodiment of the present invention.

According to one embodiment of the present invention, a method 10020 for maintaining a distance range based on a screen may mean a method for maintaining a distance range, that is, an absolute value of a difference between a minimum distance and a minimum distance even though a viewing condition is varied. In this case, the minimum distance may indicate a minimum distance between a viewer and an object, and the maximum distance may indicate a maximum distance between a viewer and an object.

In the method 10020 for maintaining a distance range based on a screen, if the maximum distance and the minimum distance are maintained on the condition that the other viewing conditions are identical and the viewing distance becomes larger, an absolute value of the disparity (parallax) may be increased to maintain the 3D effect of the stereo image in accordance with one embodiment of the present invention. Also, if the maximum distance and the minimum distance are maintained on the condition that the other viewing conditions are identical and the screen size becomes larger, an absolute value of the disparity (parallax) may be reduced to maintain the 3D effect of the stereo image in accordance with one embodiment of the present invention. At this time, the parallax may be maintained as it is. Also, if the maximum distance and the minimum distance are maintained on the condition that the other viewing conditions are identical and the IOD becomes larger, an absolute value of the disparity (parallax) may be increased to maintain the 3D effect of the stereo image in accordance with one embodiment of the present invention.

According to one embodiment of the present invention, a value applied to a compensation parameter for rendering may be varied depending upon the aforementioned compensation type. The receiver may select information related to the compensation type adaptive to the viewing environment by using the value applied to the aforementioned compensation parameter and may apply the selected information.

According to one embodiment of the present invention, a method (compensation method) for adjusting a disparity in accordance with a change of the aforementioned viewing condition may be applied to a deduction of a baseline value, which is appropriate to the receiver, when a signaled parameter for depth adjustment does not exist.

Figure 11:
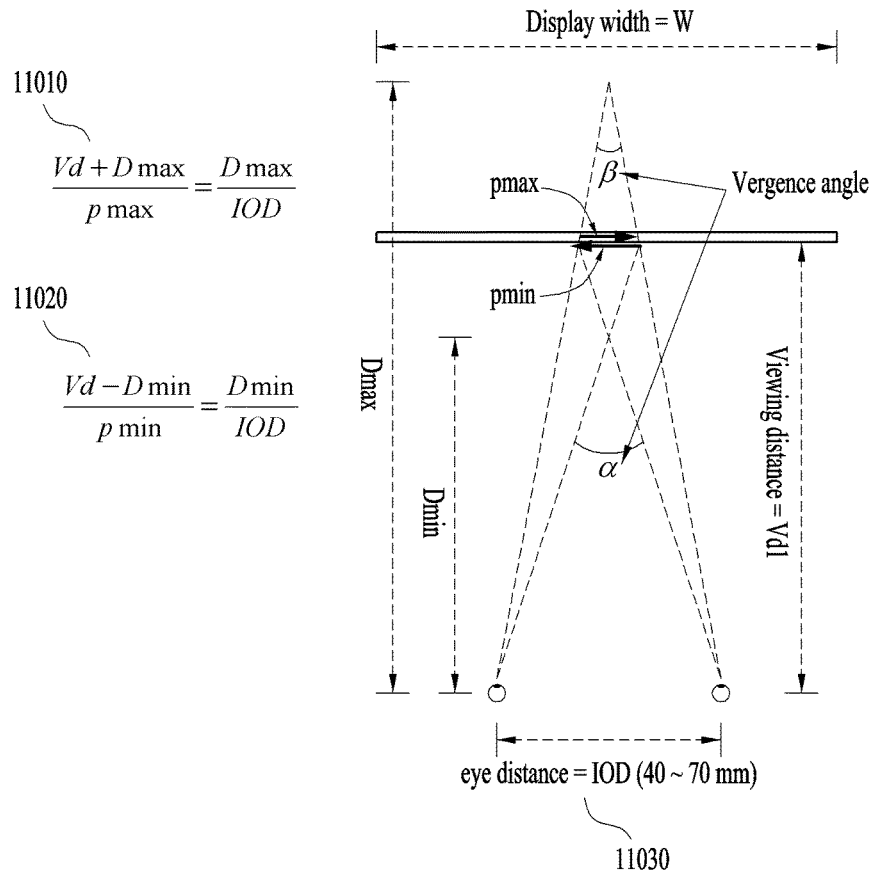
FIG. 11 is a diagram illustrating a relation between a viewing environment of a stereo image and a parallax range in accordance with one embodiment of the present invention.

FIG. 11 is a diagram illustrating a relation between a viewing environment of a stereo image and a parallax range in accordance with one embodiment of the present invention.

The method for adjusting a disparity to maintain a distance range based on a viewer or screen according to one embodiment of the present invention may use a proportional expression of a triangle shown in FIG. 11.

Referring to FIG. 11, alpha and beta may indicate the vergence angle. Dmax and Dmin may indicate a maximum distance and a minimum distance from a viewer to an object. Vd may indicate a viewing distance from a viewer to a screen. pmax may indicate the parallax when the distance from the viewer to the object is maximum, and pmin may indicate the parallax when the distance from the viewer to the object is minimum.

According to one embodiment of the present invention, proportional expressions 11010 and 11020 may be generated using a triangle shown in a drawing 11030 indicating a relation between the respective viewing conditions. When an element of a specific viewing condition has a fixed value by using the aforementioned proportional expressions, a value of an element of the other viewing condition may be deducted.

Figure 12:
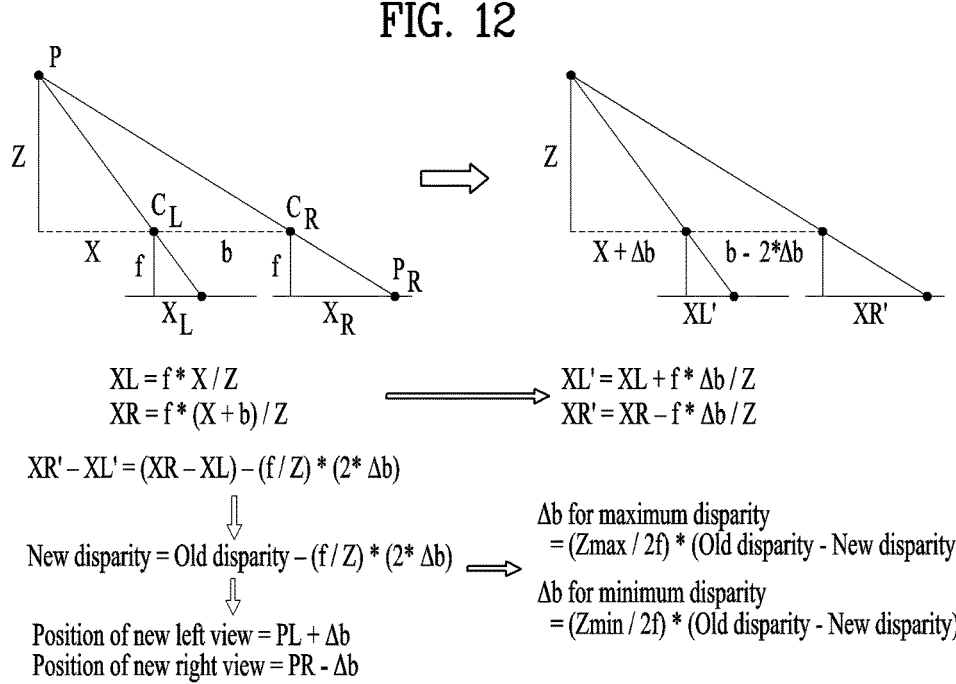
FIG. 12 is a diagram illustrating a method for performing depth adjustment if a received reference viewing condition and/or target viewing condition is mismatched with a viewing condition of a receiver in accordance with one embodiment of the present invention.

FIG. 12 is a diagram illustrating a method for performing depth adjustment if a received reference viewing condition and/or target viewing condition is mismatched with a viewing condition of a receiver in accordance with one embodiment of the present invention.

As described above, the method for adjusting a disparity in accordance with a change of a viewing condition may be applied to a deduction of an appropriate baseline value at the receiver when a parameter for signaled depth adjustment does not exist. In this case, the baseline value may mean a distance between cameras respectively capturing each of a left view and a right view, which are included in the 3D content when the 3D content is created.

In one embodiment of the present invention, if information on the parameter (i.e., baseline) that is to be adjusted does not exist, the receiver may refer to signaled target viewing condition (or reference viewing condition) and its rendering parameter value, thereby being capable of deducing a new parameter that is appropriate to the viewing condition of the receiver. That is, if the viewing distance, screen size, and/or IOD value have changed from the initial values, a new disparity may be deduced by determining a relation as to how the disparity is to be applied with respect to such change, and a baseline value that is to be adjusted based upon the new disparity value may be deduced.

As shown in FIG. 12, based upon a relation between an old disparity and a new disparity, a baseline value may be deduced by using a proportional expression of a triangle. The deduced baseline value may be used as a value for adjusting a pixel position or the number of pixels for displaying a specific image respective to each of the left image and the right image.

FIG. 13 is a diagram illustrating a configuration of stereo_3D_rendering_info_descriptor( ) that includes stereo 3D rendering info( ) according to one embodiment of the present invention.

According to one embodiment of the present invention, a compensation parameter, which is the most basic element to adjust a 3D effect of a stereo content, that is, a depth range, may be a baseline value indicating a distance between cameras respectively capturing each of two views. Therefore, in one embodiment of the present invention, the target/reference viewing condition and the related baseline distance may be signaled, and the receiver may render a stereo view optimized for the viewing condition thereof by referring to the target/reference viewing condition and the related baseline distance. In this case, the baseline may refer to the baseline distance.

The stereo_3D_rendering_info_descriptor according to one embodiment of the present invention may include a descriptor_tag field, a descriptor_length field, and/or a stereo 3D rendering info( ). The stereo_3D_rendering_info_descriptor( ) may include a target/reference viewing condition and its related compensation parameter.

The descriptor_tag field may indicate that this descriptor includes stereo 3D rendering info( ).

The descriptor_length field may indicate a length of this descriptor.

The stereo 3D rendering info( ) may include a view_pair_ID field, a target_parameter_valid_flag field, a target_display_size field, a target_IOD field, a target_viewing_distance field, a rendered_param ( ) field, a num_of_references field, a ref_parameter_valid_flag field, a compensation_type field, a ref_display_size field, a ref_IOD field, a ref_viewing_distance field, and/or a ref_compensation_param ( ) field.

The view_pair_ID field may indicate an identifier that can identify a stereo view that is currently being received. In one embodiment of the present invention, by using this view_pair_ID, it may be possible to identify to which specific Elementary Stream (ES) the left view and/or right view included in the stereo view are configured. The view_ pair_ID field may be used in association with a view_pair_descriptor, which will be described later.

The target_parameter_valid_flag field may indicate validity of viewing condition fields for viewing conditions related to a base view video stream and/or an additional view video stream.

The target_display_size field may indicate a recommended display size that is optimized for the stereo content, which is transmitted. If the aspect ratio is fixed, the target_display_size field may indicate values corresponding to diagonal lengths 47 inches, 55 inches, and so on. The target_display_size field may be expressed as a distance of a display width. The target_display_size field may be processed to be significant only when a first bit of the target_parameter_valid_flag is equal to '1'.

The target_IOD field may indicate an IOD optimized for the stereo content, which is transmitted. The target_IOD may be distributed within a range of 40 mm to 80 mm. The target_IOD may be processed to be significant only when a second bit of the target_parameter_valid_flag is equal to '1'.

The target_viewing_distance field may indicate a recommended viewing distance that is optimized to view the stereo content, which is transmitted. The target_viewing_distance field may be processed to be significant only when a third bit of the target_parameter_valid_flag is equal to '1'.

The rendered_param ( ) field may indicate a value which can be referred to when the receiver newly renders the stereo content. For example, the rendered_param ( ) field may include a baseline distance indicating a distance between left and right cameras when the cameras respectively capturing the stereo content. The rendered_param ( ) field may include other parameters for compensating the stereo view. The rendered_param ( ) field may be processed to be significant only when a fourth bit of the target_parameter_valid_flag is equal to '1'.

The num_of_references field may indicate the number of guide information required for generating a virtual view. In this case, the guide information may mean the viewing condition and its related parameter set.

The ref_parameter_valid_flag field may signal the validity of fields of the viewing condition related to the generation of a virtual view.

The compensation_type field may indicate a factor on which is based to obtain the reference viewing condition and compensation parameter. This will be described later in detail.

Although the ref_display_size field does not correspond to a value optimized for the stereo content, which is transmitted, the field may indicate a display size that can be referred to in accordance with the viewing condition of the receiver. The ref_display_size field may be processed to be significant only when a first bit of the ref_parameter_valid_flag is equal to '1'.

The ref_IOD field does not correspond to a value optimized for the stereo content, which transmitted, however, the field may indicate an IOD that can be referred to in accordance with the viewing condition of the receiver. The ref_IOD field may be processed to be significant only when a second bit of the ref_parameter_valid_flag is equal to '1'.

The ref_viewing_distance field does not correspond to a value optimized for the stereo content, which is transmitted, however, the field may indicate an IOD that can be referred to in accordance with the viewing condition of the receiver. The ref_viewing_distance field may be processed to be significant only when a third bit of the ref_parameter_specified_flag is equal to '1'.

The ref_compensation_param ( ) field may indicate a value that can be referred to when the receiver newly renders the stereo content. The ref_compensation_param( ) field may mean a compensation parameter corresponding to the reference viewing condition. For example, the ref_compensation_param ( ) field may include a baseline distance between two left and right cameras respectively capturing each of the left view and the right view when producing the stereo content which is transmitted. A ref_baseline_distance field may be included in the ref_compensation_param ( ) field. The ref_compensation_param( ) field may include other parameters for compensating the stereo view. The ref_compensation_param ( ) field may be processed to be significant only when a fourth bit of the ref_parameter_valid_flag is equal to '1'.

According to one embodiment of the present invention, the aforementioned view_pair_ID, target_parameter_valid_flag, target_display_size, target_IOD, target_viewing_distance and/or rendered_param( ) may indicate information on streams included in an actual service. The aforementioned num_of_references, ref_parameter_valid_flag, compensation_type, ref_display_size, ref_IOD, ref_viewing_distance and/or ref_compensation_param( ) may be required to generate a virtual view in accordance with one embodiment of the present invention.

FIG. 14 is a diagram illustrating a configuration of compensation_type according to one embodiment of the present invention.

When the value of the compensation_type field according to one embodiment of the present invention is set to '0x00', this may indicate the method for compensating for the stereo view on the condition that a value of the vergence angle among the elements constituting the viewing condition is maintained as it is. When the value of the compensation_type field is set to '0x01', this may indicate the method for compensating for the stereo view on the condition that a value of a parallax angle among the elements constituting the viewing condition is maintained as it is. When the value of the compensation_type field is set to '0x02', this may indicate the method for compensating for the stereo view on the condition that a value of the distance range based on a viewer among the elements constituting the viewing condition is maintained as it is. When the value of the compensation_type field is set to '0x03', this may indicate the method for compensating for the stereo view on the condition that a value of the distance range based on a screen among the elements constituting the viewing condition is maintained as it is.

According to one embodiment of the present invention, the reference viewing condition and/or its related compensation parameter may be determined based on the factor indicated by the compensation_type field.

FIG. 15 is a diagram illustrating a configuration of view_pair_descriptor( ) according to one embodiment of the present invention.

The view_pair_descriptor( ) according to one embodiment of the present invention may include configuration information of a 3D view pair.

The view_pair_descriptor( ) according to one embodiment of the present invention may include a descriptor_tag field, a descriptor_length field, a num_of_view_pairs field, a view_pair_ID field, a left_PID field and/or a right_PID field.

The descriptor_tag field may indicate that this descriptor includes information on the 3D view pair.

The descriptor_length field may indicate a length of this descriptor.

The num_of_view_pairs field may indicate the number of stereo pairs included in a program The view_pair_ID field may indicate an identifier than can identify each stereo view pair. In one embodiment of the present invention, by using this view_pair_ID, a specific ES stream to which the left view and/or right view is configured may be identified.

The left_PID field may indicate a PID value of an image corresponding to the left view.

The right_PID field indicates a PID value of an image corresponding to the right view.

Although not shown, the view_pair_descriptor( ) field may include PID information that can respectively identify each stream including depth information on the left depth and/or right depth.

FIG. 16 is a diagram illustrating a configuration of a program map table (PMT) according to one embodiment of the present invention.

According to one embodiment of the present invention, the aforementioned stereo_3D_rendering_info_descriptor( ) may be signaled by being included in a program level of the PMT (option 1).

According to another embodiment of the present invention, the aforementioned stereo_3D_rendering_info_descriptor( ) may be signaled by being included in an elementary stream level corresponding to a depth stream within the PMT (option 2).

According to still another embodiment of the present invention, the aforementioned stereo_3D_rendering_info_descriptor( ) may be signaled by being included in a video elementary stream level corresponding to a depth within the PMT (option 3).

According to one embodiment of the present invention, the stereo view included in the program may be signaled through the view_pair_descriptor field included in the program level of the PMT.

Figure 17:
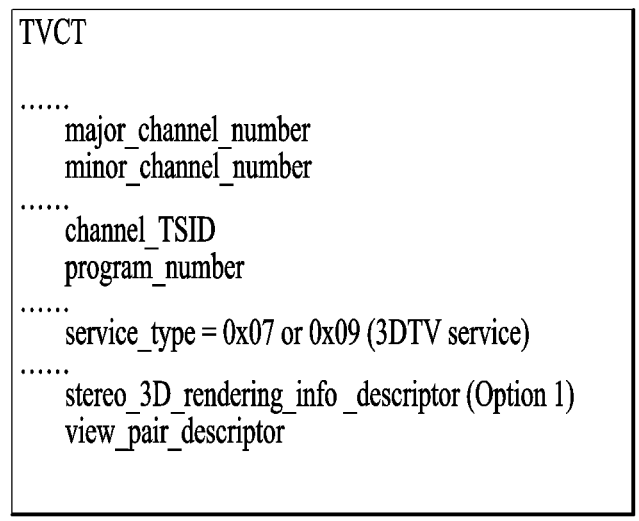
FIG. 17 is a diagram illustrating a configuration of a terrestrial virtual channel table (TVCT) according to one embodiment of the present invention.

FIG. 17 is a diagram illustrating a configuration of a terrestrial virtual channel table (TVCT) according to one embodiment of the present invention.

According to one embodiment of the present invention, the aforementioned stereo_3D_rendering_info_descriptor( ) may be signaled by being included in a channel level descriptor of the TVCT (option 1).

According to another embodiment of the present invention, fields of the aforementioned stereo_3D_rendering_info_descriptor( ) may be signaled by being included in a component list descriptor of the TVCT (option 2).

According to still another embodiment of the present invention, fields of the aforementioned stereo_3D_rendering_info_descriptor( ) may be signaled by being included in a service location descriptor of the TVCT (option 3).

According to one embodiment of the present invention, the stereo view included in the program may be signaled through the view_pair_descriptor field included in the channel level of the TVCT.

FIG. 18 is a diagram illustrating a configuration of a service description table (SDT) according to one embodiment of the present invention.

According to one embodiment of the present invention, the aforementioned stereo_3D_rendering_info_descriptor( ) may be signaled by being included in a service level descriptor of the SDT (option 1). At this time, the stereo_3D_rendering_info_descriptor( ) may include information on all views.

According to one embodiment of the present invention, the stereo view included in the program may be signaled through the view_pair_descriptor field included in the service level descriptor of the SDT.

The SDT according to one embodiment of the present invention includes a table_id field, a section_syntax_indicator field, a section_length field, a transport_stream_id field, a version_number field, a current_next_indicator field, a section_number field, a last_section_number field, an original_network_id field, a service_id field, an EIT_schedule_flag field, an EIT_present_following_flag field, a running_status field, a free_CA_mode field, a descriptors_loop_ length field, a descriptor ( ) field, and/or a CRC_32 field.

The table_id field identifies a type of a table. The table_id field serves to indicate that a corresponding table section configures the SDT.

The section_syntax_indicator field indicates a format of a table section preceded by a corresponding field. If a value of the corresponding field is set to '0', this indicates that the corresponding table section is a short format. If a value of the corresponding field is set to '1', the corresponding table section follows a general long format.

The section_length field indicates a length of the corresponding table section. The section_length field may indicate a length from a field next to the corresponding field to the end of the corresponding table section.

The transport_stream_id field identifies a transport stream (TS) which is to be described in the corresponding table.

The version_number field indicates a version number of a private table section. The receiver may discover the latest one of table sections stored in a memory by using this version_number field and the current_next_indicator field which will be described later.

If a value indicated by the current_next_indicator field is set to 1, this indicates that a table which is currently transmitted is valid. If the value indicated by the current_next_indicator field is set to 0, this indicates that a table which is currently transmitted is not valid currently but will be valid later.

The section_number field indicates an order of the corresponding section belonging to the corresponding table.

The last_section_number field indicates an order of the last one of sections belonging to the corresponding table.

The original_network_id field may identify an initial broadcasting station that has transmitted a service described in the corresponding table.

The service_id field identifies each service existing in the transport stream. This service_id field may be identical to the program_number field of the PMT in view of its function.

If a value indicated by the EIT_schedule_flag field is set to 1, this indicates that EIT schedule information (EIT schedule flag) for the corresponding service is included in the current TS. If the value indicated by the EIT_schedule_flag field is set to 0, this indicates that the EIT schedule information is not included in the current TS.

If a value indicated by the EIT_present_following_flag field is set to 1, this indicates that EIT_present_following information for the corresponding service is included in the current TS. If the value indicated by the EIT_present_following_flag field is set to 0, this indicates that the EIT_present_following information is not included in the current TS.

The running_status field indicates a status of the service. For example, if a value of the running_status field is set to 1, this indicates that the service is "not running", if a value of the running_status field is set to 2, this indicates that the service "starts in a few seconds", if a value of the running_status field is set to 3, this indicates that the service is "pausing", if a value of the running_status field is set to 4, this indicates that the service is "running", and if a value of the running_status field is set to 5, this indicates that the service is "service off-air".

If a value indicated by the free_CA_mode field is set to 0, this indicates that all of the component streams of the corresponding service are not scrambled. If a value indicated by the free_CA_mode field is set to 1, this indicates that access to one or more streams are controlled by a CA system. The CA system is abbreviated from Conditional Access system, and means a system that provides an encryption function of broadcast contents and a function of allowing only contractors to view the broadcast contents by decoding an encryption code to limit viewing of broadcasting to the contractors.

The descriptors_loop_length field indicates a total length of the following descriptors preceded by the corresponding field.

The descriptor ( ) field means a descriptor respective to a service. The above-described stereo_3D_rendering_info_descriptor ( ) and/or view_pair_descriptor( ) may correspond to this descriptor ( ) field.

The CRC_32 field indicates a CRC value used to identify whether there is any error in data included in the corresponding table section.

FIG. 19 is a diagram illustrating a configuration of user_data_registered_itu_t_t35( ) according to another embodiment of the present invention.

According to one embodiment of the present invention, the stereo 3D rendering info( ) descriptor may be transmitted by being included in a Supplemental Enhancement Information (SEI) message of a video data header or video stream not PSI/PSIP/DVB-SI information in the form of a descriptor unlike the aforementioned description.

Referring to FIG. 19, in case of H.264 (or AVC) video, corresponding information is transmitted to an SEI section. In this case, a user_identifier and a user_structure may be included in a user_data_registered_itu_t.sub.-135( ). That is, corresponding information is transmitted to SEI payloads instead of user_data( ). The SEI performs the function of picture extension and user data of MPEG-2 and may also similarly constraint the location. That is, FIG. 19 illustrates a method for transmitting the stereo_3D_rendering_info( ) by being included in AVC/H.264.

The user_data_registered_itu_t_t35( ) according to one embodiment of the present invention may include itu_t_t35_country_code, itu_t_t35_provider_code, user_identifier and/or user_structure( ).

FIG. 20 is a diagram illustrating a user_identifier value used for DVB and user_structure( ) corresponding to the user_identifier value according to one embodiment of the present invention.

According to one embodiment of the present invention, if the user_identifier has a value of '0x47413934 ('GA94')', the user_structure ( ) may indicate DVB1_data ( ), and if the user_identifier has a value of '0x44544731 ('DTG1')', the user_structure ( ) may indicate afd_data( ).

The detailed description of the field shown in FIG. 20 may be replaced with the description previously known in the art and the description of specifications.

FIG. 21 is a diagram illustrating a configuration of DVB1_data( ) according to one embodiment of the present invention.

According to one embodiment of the present invention, the DVB1_data ( ) may include a user_data_type_code and/or a user_data_type_structure ( ).

The user_data_type_code indicates different types of data carried in the user_data_type_structure ( ).

According to one embodiment of the present invention, the user_data_type_structure ( ) may include information included in the aforementioned stereo_3D_rendering_info_descriptor.

The detailed description of the field shown in FIG. 21 may be replaced with the description previously known in the art and the description of specifications.

FIG. 22 is a diagram illustrating a configuration of an SEI message that includes stereo 3D rendering info according to one embodiment of the present invention.

The SEI message that includes the stereo 3D rendering info according to one embodiment of the present invention may be referred to as stereo_3D_rendering_info_data( ) or stereo 3D rendering info SEI message.

The stereo_3D_rendering_info_data( ) according to one embodiment of the present invention may include a stereo_3D_rendering_info_id field, a stereo_3D_rendering_info_cancel_flag field, and/or a stereo 3D rendering info( ) field.

The stereo_3D_rendering_info_id field may identify information combination included in the stereo_3D_rendering_info_data( ).

If a value of the stereo_3D_rendering_info_cancel_flag field is set to 1, this may indicate that the stereo 3D rendering info, which has been applied up to a previous picture, is no longer applied.

One embodiment of the present invention may provide a method for transmitting stereo_3D_rendering_info_data( ) to signal information related to the stereo 3D rendering at a video level.

According to one embodiment of the present invention, if the stereo_3D_rendering info SEI message is included in video data or depth stream of a specific view, 3D information on a view of the corresponding stream may be signaled through the stereo_3D_rendering_info_data ( ). In one embodiment of the present invention, the stereo_3D_rendering_info_data ( ) may be received through SEI RBSP (raw byte sequence payload). In one embodiment of the present invention, after parsing an AVC NAL unit, a user_identifier value may be identified by reading a user_data_registered_itu_t_t35 SEI message having a nal_unit_type value of 6 and a payloadtype of 4. In this case, if the nal_unit_type value is set to 6, this may correspond to SEI message. In one embodiment of the present invention, a user_structure( ) having a user_identifier value of 0x47413934 may be read and data having a user_data_type_code of 0x12 may be extracted. In one embodiment of the present invention, by parsing the stereo_3D_rendering_info_data ( ) having a user_data_type_ code of 0x12, 3D acquisition information and information for future virtual 3D view generation may be acquired.

The stereo 3D rendering info( ) field according to one embodiment of the present invention may include a view_pair_id field, a target_parameter_valid_flag field, a target_display_size field, a target_IOD field, a target_viewing_distance field, a rendered_param ( ) field, a num_of_references field, a ref_parameter_valid_flag field, a compensation_type field, a ref_display_size field, a ref_IOD field, a ref_viewing_distance field, and/or ref_compensation_param ( ) field. Meanings indicated by the aforementioned fields included in the stereo 3D rendering info( ) have been described as above.

According to one embodiment of the present invention, the view_pair_ID field may be used to be associated with information included in the view_pair_descriptor of a program/channel/service level in PSI/PSIP/SI. According to another embodiment of the present invention, PID of each ES respective to each of the left view and the right view may also be directly signaled.

FIG. 23 is a diagram illustrating a configuration of stereo_3D_rendering_info_SEI_descriptor( ) according to one embodiment of the present invention.

The stereo_3D_rendering_info_SEI_descriptor( ) according to one embodiment of the present invention may be included in a program level or stream level of the PMT. The stereo_3D_rendering_info_SEI_descriptor( ) may include information as to whether or not a stereo 3D rendering info SEI message is included in the corresponding video data. Therefore, the receiver may in advance know whether the stereo 3D rendering info SEI message is included in the corresponding video data, at the system level.

The stereo_3D_rendering_info_SEI_descriptor( ) according to one embodiment of the present invention may include a descriptor_tag field, a descriptor_length field and/or a stereo_3D_rendering_info_SEI_message_exist_flag field.

The descriptor_tag field may indicate that this descriptor indicates information as to whether the stereo 3D rendering info SEI message is included in the corresponding video data.

The descriptor_length field may indicate a length of this descriptor.

The stereo_3D_rendering_info_SEI_message_exist_flag field may indicate whether or not a stereo 3D rendering SEI message, which can identify in detail information related to stereo 3D rendering SEI message, is included in the received video stream.

Figure 24:
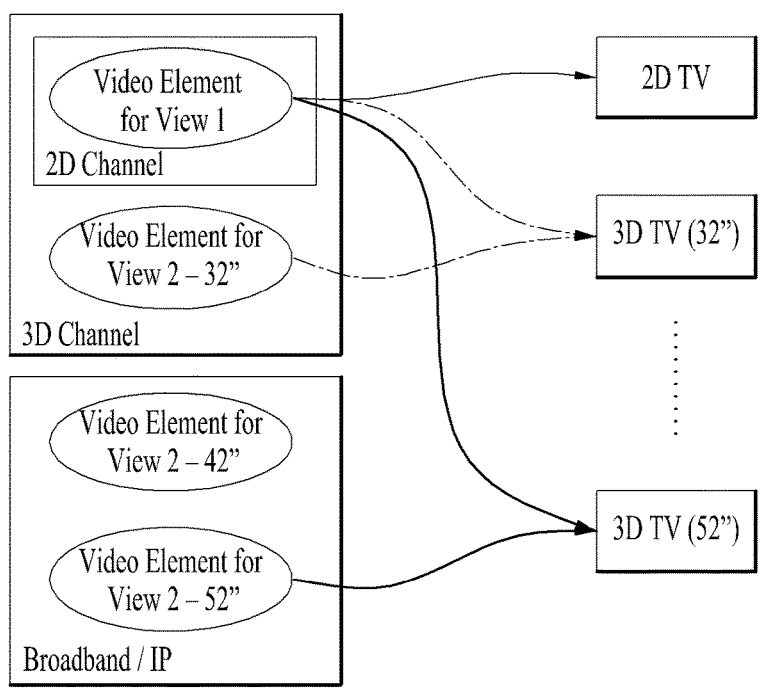
FIG. 24 is a diagram illustrating a broadcast service structure for providing a stereo view adaptive to a screen size according to one embodiment of the present invention.

FIG. 24 is a diagram illustrating a broadcast service structure for providing a stereo view adaptive to a screen size according to one embodiment of the present invention.

According to one embodiment of the present invention, if viewing conditions having high distribution levels are selected in advance and therefore the transmitter creates in advance a content adaptive to each viewing condition, the transmitter may fixedly transmit one view image and may variably transmit the other view. As a result, in one embodiment of the present invention, consumption of resources such as bandwidth may be reduced as compared with that all stereo view pairs respective to each case of each viewing condition are transmitted.

Referring to FIG. 24, a video element for view 1 may indicate a view applied to all receivers (including 2D and 3D receivers). A video element for view 2—32" may indicate a view applied to a receiver having a screen size of 32 inches. A video element for view 2—42" may indicate a view applied to a receiver having a screen size of 42 inches. A video element for view 2—52" may indicate a view applied to a receiver having a screen size of 52 inches. In this case, the video element for view 2—42" and/or the video element for view 2—52" may be transmitted through a broadband and/or IP network.

FIG. 25 is a diagram illustrating that signaling methods and signaling contents of a broadcast service according to one embodiment of the present invention are identified depending on types of a transport channel.

According to one embodiment of the present invention, in case of a 2D channel, only a base view video may be transmitted to an in-band channel. In case of a 3D channel, a base view video and/or additional view video elements may be transmitted to an in-band channel.

According to one embodiment of the present invention, the additional view video elements may be transmitted to a broadband channel and/or other channel.

According to one embodiment of the present invention, a service transmitted to an in-band channel may be signaled through a PMT program level, a TVCT channel level, a SDT service level, an EIT event level, and/or a video stream header (SEI message).

According to one embodiment of the present invention, a service transmitted to a broadband channel may be signaled at an IP layer and/or a video level. A service transmitted to other channel may be signaled through a PMT program level, a TVCT channel level, a SDT service level, an EIT event level, and/or a video stream header (SEI message).

In case of a service transmitted to an in-band channel, in one embodiment of the present invention, a target viewing condition for combination of a base view and additional view elements and its related parameter may be signaled. In one embodiment of the present invention, conditional information on a virtual view that can be rendered by view synthesis may be signaled. In one embodiment of the present invention, signaling information of additional view video elements that can be received through out-of-band (including broadband) may be signaled. In this case, the signaling information of additional view video elements may include IP address, ES PID, schedule information, etc. of the additional view video elements.

In case of a service transmitted to a broadband and/or other channel, in one embodiment of the present invention, signaling information of a base view may be signaled. In this case, the signaling information of a base view may include a channel, PID, etc. of the base view. In one embodiment of the present invention, conditional information on a virtual view that can be rendered by view synthesis may be signaled. This will be described later in detail. In one embodiment of the present invention, a field may be configured to prevent the service transmitted to a broadband and/or other channel from being received by a legacy TV. In this case, the field configured to prevent the service from being received by a legacy TV may include a hidden channel, an unknown service type, and so on.

FIG. 26 is a diagram illustrating a configuration of stereo_3D_viewing_condition_info_descriptor( ) according to one embodiment of the present invention.

If viewing conditions having high distribution levels are selected in advance and therefore the transmitter generates in advance a content adaptive to each viewing condition, in order to minimize resources, such as a bandwidth that is required for transmitting all stereo view pairs respective to each case, the transmitter may fixedly transmit only one view and may transmit the other views in real-time or non-real-time through a separate independent path.

In this case, the view pair descriptor( ) may be transmitted by being included in signaling section information of a channel to which additional view video is transmitted, and configuration information of a 3D view pair may be included in the view pair descriptor( ).

The stereo_3D_viewing_condition_info_descriptor( ) may include a base_channel_number field, a base_program_number field, a base_source_id field, a base_network_id field, a base_PID field, and/or a num_of_view_pairs field.

The base_channel_number field indicates a channel number transmitting the related base view video in case only the additional view video is transmitted through a current channel or other paths.

The base_program_number field indicates a program number of the related base view video in case only the additional view video is transmitted through a current channel or other paths.

The base_source_id field corresponds to an identifier identifying a source of the related base view video in case only the additional view video is transmitted through a current channel or other paths.

The base_network_id field corresponds to an identifier identifying a network that provides the related base view video in case only the additional view video is transmitted through a current channel or other paths.

The base_PID field indicates a PID of a packet transmitting the related base view video in case only the additional view is transported through a current channel or other paths.

The num_of_view_pairs field indicates the number of stereo 3D views that are provided.

The description of the other fields will be replaced with the description of each field of the stereo_3D_rendering_info_descriptor( ).

Figure 27:
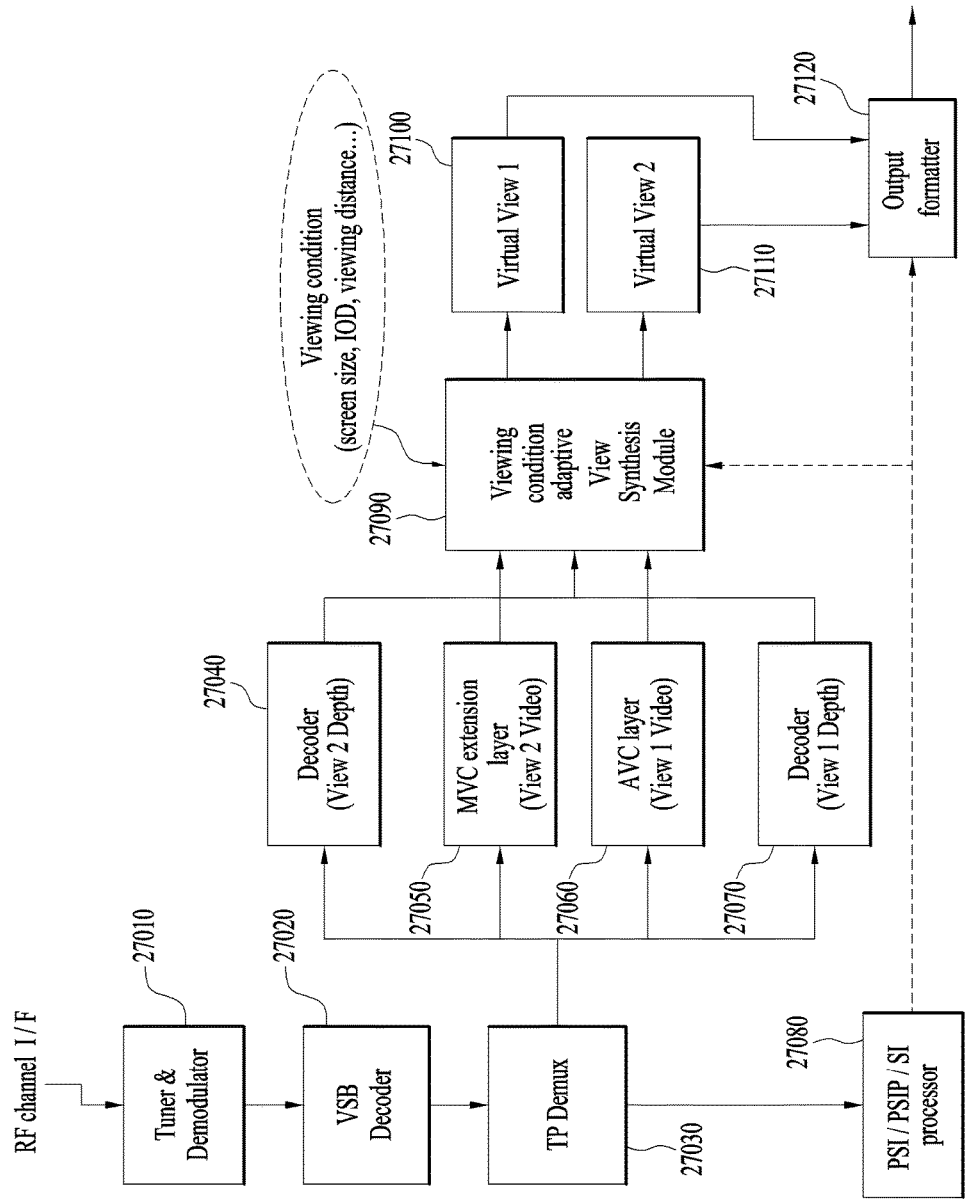
FIG. 27 is a diagram illustrating a configuration of a receiver according to one embodiment of the present invention.

FIG. 27 is a diagram illustrating a configuration of a receiver according to one embodiment of the present invention.

A receiver providing a 3D view adaptive to the viewing condition may include a tuner and demodulator 27010, a VSB decoder 27020, a transport packet demultiplexer 27030, a second decoder 27040, an MVC extension layer decoder 27050, an AVC layer decoder 27060, a first decoder 27070, a PSI/PSIP/SI processor 27080, a view synthesis module 27090, a first virtual view generator 27100, a second virtual view generator 27110, and/or an output formatter 27120.

The tuner and demodulator 27010 performs tuning to a 3D broadcast channel and demodulates a received signal.

The VSB decoder 27020 decodes a signal having VSB applied thereto. Although the name of this block is referred to as a VSB decoder, this block may also be viewed as a block decoding a signal having OFDM applied thereto.

The transport packet demultipelxer 27030 splits a transport packet from the broadcast signal. More particularly, this transport packet demultiplexer 27030 performs a function of filtering a packet identifier.

The second decoder 27040 decodes depth information for a second view.

The MVC extension layer decoder 27050 decodes data for the second view.

The AVC layer decoder 27060 decodes data for a first view.

The first decoder 27070 decodes depth information for the first view.

The PSI/PSIP/SI processor 27080 performs processing of a signaling signal. For example, this PSI/PSIP/SI processor 27080 performs a function of processing diverse tables included in the PSIP or DVB SI, or a function of processing a signaling packet, a signaling segment, and so on. The PSI/PSIP/SI processor 27080 may perform a function of processing information included in the aforementioned descriptor, and so on.

The view synthesis module 27090 may generate a virtual view. The detailed description of the view synthesis module 27090 will be replaced with the aforementioned description of the view synthesis module.

The first virtual view generator 27100 renders a first virtual view based on information or data synthesized by the view synthesis module. For example, the first virtual view may correspond to a left view included in the 3D view.

The second virtual view generator 27110 renders a second virtual view based on information or data synthesized by the view synthesis module. For example, the second virtual view may correspond to a right view included in the 3D view.

The output formatter 27120 formats a 3D view by combining the first virtual view and the second virtual view.

Figure 28:
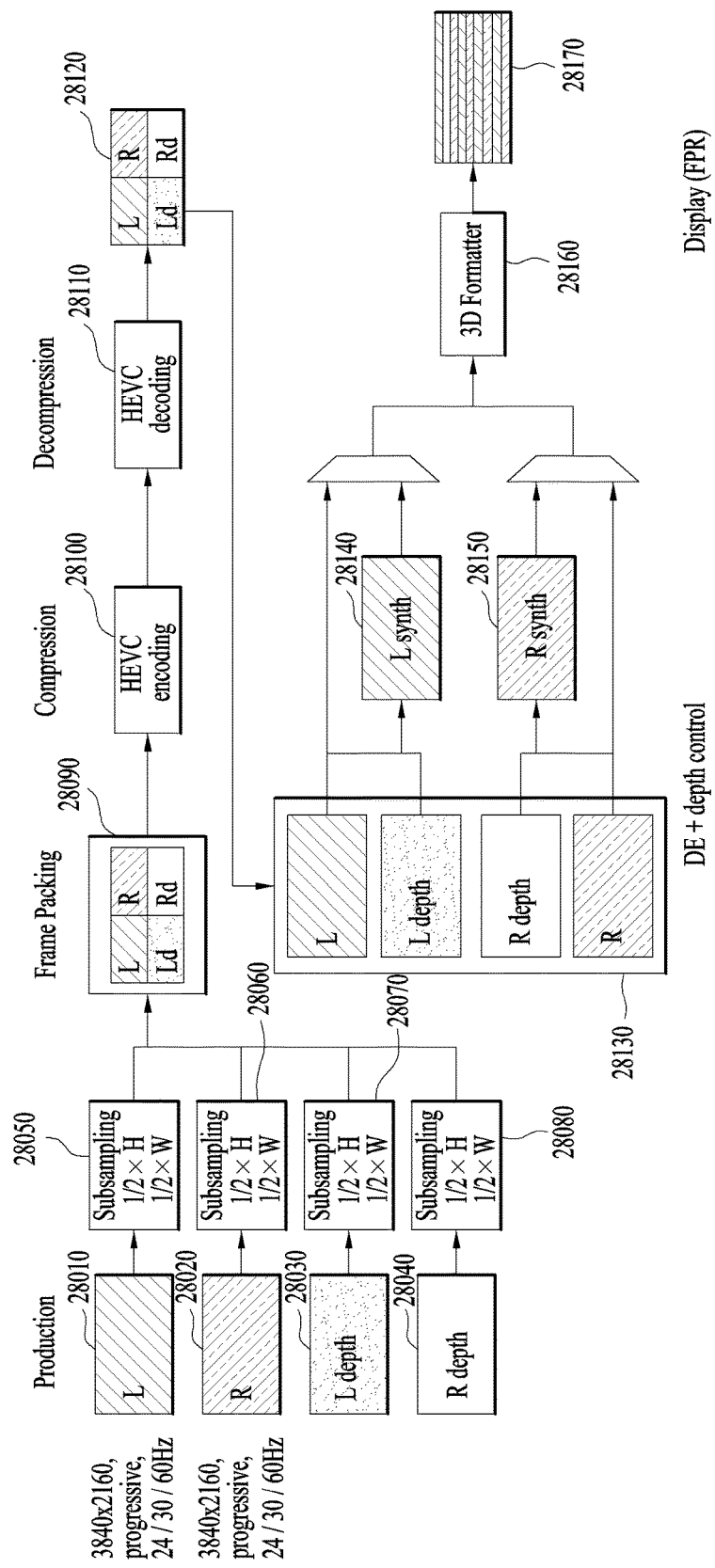
FIG. 28 is a diagram illustrating a frame compatible procedure according to one embodiment of the present invention.

FIG. 28 is a diagram illustrating a frame compatible procedure according to one embodiment of the present invention.

According to one embodiment of the present invention, one frame may include a left view, a right view, depth information on a left view and/or depth information on a right view. In this case, the frame may include an UHD frame.

In one embodiment of the present invention, a glassless 3D service may be supported using a frame structure shown in FIG. 28. In this case, the frame structure may a single 4K frame structure.

According to one embodiment of the present invention, a 4K-grade left view 28010, a 4K-grade right view 28020, a depth view on a 4K-grade left view 28030 (L depth) and/or a depth view for a 4K-grade right view 28040 (R depth), which are produced during production step, may respectively be subsampled 28050, 28060, 28070 and 28080 with a height of ½ and a frame of ½. In this case, the left view and/or the right view of the production step may correspond to video views with resolution of 3840×2160, a progressive scanning mode and a frame rate of 24/30/60 hz. The subsampled left view, the subsampled right view, the subsampled depth view for a left view, and/or the subsampled depth view for a right view may be packed in one frame (frame packing, 28090). In this case, according to another embodiment of the present invention, if the left view, the right view, the depth view for the left view and/or the depth view for the right view are produced at HD grade during the production step, the corresponding views may be packed in one 4K-grade frame without the aforementioned subsampling procedure. In this case, subsampling according to one embodiment of the present invention may refer to downsampling. The packed frame may be encoded and then transmitted to the receiver (compression, HEVC encoding, 28100). The receiver according to one embodiment of the present invention may receive and decode the encoded (decompression, HEVC decoding, 28010). The left view, the right view, the depth view for the left view and/or the depth view for the right view, which constitute the decoded frame 28120 may respectively be upsampled at their original sizes (28130). In one embodiment of the present invention, a left view 28140 synthesized using the left view and the depth view for the left view may be generated. In one embodiment of the present invention, a right view 28150 synthesized using the right view and the depth view for the right view may be generated. The 3D formatter 28160 according to one embodiment of the present invention may format and display a 3D view by combining the generated synthesized left view and the generated synthesized right view. In this case, the depth view for the left view and/or the depth view for the right view may be referred to as a depth map (28170).

In one embodiment of the present invention, a method for generating a 4K frame, which includes a left view, a right view and/or a depth map, may be provided to provide a 3D service of a glassless mode.

According to one embodiment of the present invention, the left view and/or the right view may have full HD (FHD) resolution based on a transport format, and the synthesized left view and/or the synthesized right view may have FHD resolution.

According to one embodiment of the present invention, resolution of the depth map may be lower than FHD resolution based on the transport format.

If the 4K frame (including the left view, the right view and/or the depth map) according to one embodiment of the present invention is transmitted by HEVC compression, a bit rate may be 15 Mbps to 20 Mbps. That is, the bit rate of the same level as a 2D view may be obtained. According to one embodiment of the present invention, the bit rate may be a value deducted when a bit rate of 30% with respect to the same depth map and a bit rate of 20% with respect to efficiency overhead due to frame packing are assumed.

The 4K frame (including the left view, the right view and/or the depth map) according to one embodiment of the present invention may be transmitted through a terrestrial broadcast network, a cable network and/or satellite network. In this case, if the 4K frame is transmitted through a terrestrial broadcast network, one embodiment of the present invention may follow DVB-T2. If the 4K frame is transmitted through a cable network, one embodiment of the present invention may follow DVB-C2. If the 4K frame is transmitted through a satellite network, one embodiment of the present invention may follow DVB-S2.

In one embodiment of the present invention, signaling that a transmitted frame has a format for a left view, a right view and/or a depth map (depth view for a left view and/or depth view for a right view) included in one frame may be performed.

In one embodiment of the present invention, signaling that a transmitted frame has a frame format for a left view, a right view and/or a depth map included in one frame may be performed at a video level and/or system level.

If signaling is performed at a video level in accordance with one embodiment of the present invention, signaling that a frame transmitted through a frame packing arrangement SEI message within a video elementary stream (ES) (HEVC) has a frame format for a left view, a right view and/or a depth map included in one frame may be performed. A frame packing arrangement SEI message may include a frame_packing_arrangement_type field, a frame_packing_arrangement_reserved_byte field, a spatial_flipping_flag field and/or a frame0_flipped_flag field. In this case, the frame_packing_arrangement_type field may indicate that the corresponding frame is a frame format for a left view, a right view and/or a depth map included in one frame. The frame_packing_arrangement_reserved_byte field may indicate a bit depth of the depth map. The spatial_flipping_flag field and/or the frame0_flipped_flag field may indicate whether the left view and/or the right view is subjected to horizontal flipping.

If signaling is performed at a system level in accordance with one embodiment of the present invention, a stream type may be set 0x24 within a program map table (PMT) equally to HEVC and a value indicated by an FPA_SEI_not_present_flag field within an HEVC descriptor may be set to 0. That is, when a value of the FPA_SEI_not_present_flag is set to 0, the receiver may identify detailed information on the frame format for a left view, a right view and/or a depth map included in one frame through video level signaling information. In one embodiment of the present invention, signaling that a corresponding component (ES) includes a frame format for a left view, a right view and/or a depth map included in one frame may be performed through component (ES) level signaling within PSIP/SI. In this case, the component may mean an elementary stream (ES).

FIG. 29 is a diagram illustrating a method for mapping a depth map into a 8-bit 4K frame in accordance with one embodiment of the present invention.

In one embodiment of the present invention, a pixel (12-bit depth pixel) having bit depth of 12 bits may be mapped into a pixel of a 4K frame having YcbCr of 4:2:0 (29010). For example, according to one embodiment of the present invention, fourth to eleventh bits of D0 shown in FIG. 29 may be mapped into 0th to seventh bits of Y0, 0th to third bits of D0 may be mapped into fourth to seventh bits of Cb0, fourth to eleventh bits of D1 may be mapped into 0th to seventh bits of Y1, 0th to third bits of D1 may be mapped into 0th to third bits of Cb0, fourth to eleventh bits of D2 may be mapped into 0th to seventh bits of Y2, 0th to third bits of D2 may be mapped into fourth to seventh bits of Cr0, fourth to eleventh bits of D3 may be mapped into 0th to seventh bits of Y3, and 0th to third bits of D3 may be mapped into 0th to third bits of Cr0.

In one embodiment of the present invention, a pixel (10-bit depth pixel) having bit depth of 10 bits may be mapped into a pixel of a 4K frame having YcbCr of 4:2:0 (29020). For example, according to one embodiment of the present invention, second to ninth bits of D0 shown in FIG. 29 may be mapped into 0th to seventh bits of Y0, 0th and first bits of D0 may be mapped into sixth and seventh bits of Cb0, second to ninth bits of D1 may be mapped into 0th to seventh bits of Y1, 0th and first bits of D1 may be mapped into fourth and fifth of Cb0, second to ninth bits of D2 may be mapped into 0th to seventh bits of Y2, 0th and first bits of D2 may be mapped into second and third bits of Cr0, second to ninth bits of D3 may be mapped into 0th to seventh bits of Y3, and 0th to third bits of D3 may be mapped into 0th and first bits of Cr0.

Figure 30:
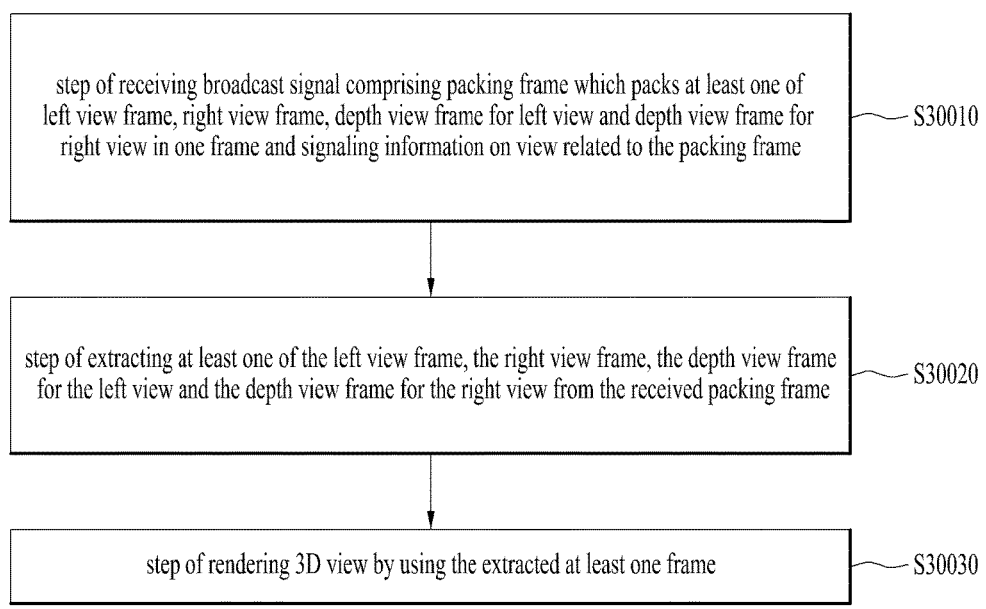
FIG. 30 is a diagram illustrating a method for receiving a broadcast signal in accordance with one embodiment of the present invention.

FIG. 30 is a diagram illustrating a method for receiving a broadcast signal in accordance with one embodiment of the present invention.

A method for receiving a broadcast signal in accordance with one embodiment of the present invention may comprise a step S30010 of receiving a broadcast signal that includes a packing frame and signaling information on a view related to the packing frame, the packing frame being obtained by packing at least one of a left view frame, a right view frame, a depth view frame for a left view and a depth view frame for a right view in one frame, a step S30020 of extracting at least one of the left view frame, the right view frame, the depth view frame for a left view and the depth view frame for a right view from the received packing frame, and/or a step S30030 of rendering a 3D view by using the extracted at least one frame.

A receiver according to one embodiment of the present invention may receive a broadcast signal that includes a packing frame and signaling information on a view related to the packing frame, the packing frame being obtained by packing at least one of a left view frame, a right view frame, a depth view frame for a left view and a depth view frame for a right view in one frame. The detailed description of the receiver has been made in the description made with reference to FIG. 28.

An extractor according to one embodiment of the present invention may extract at least one of the left view frame, the right view frame, the depth view frame for a left view and the depth view frame for a right view from the received packing frame. The detailed description of the extractor has been made in the description made with reference to FIG. 28.

A rendering module according to one embodiment of the present invention may render a 3D view by using the extracted at least one frame. The rendering module may be referred to as an output formatter and/or a 3D formatter. The detailed description of the rendering module has been made in the description made with reference to FIGS. 27 and 28.

According to another embodiment of the present invention, the packing frame may generate depth information included in a depth view frame for the left view and depth information included in a depth view frame for the right view by mapping them into color spatial components indicating the packing frame in a bit unit. The detailed description of the packing frame has been made in the description made with reference to FIG. 29.

According to another embodiment of the present invention, the signaling information may include frame packing arrangement information indicating that the frame included in the broadcast signal is a packing frame. The detailed description of the frame packing arrangement information has been made in the description made with reference to FIG. 28.

According to another embodiment of the present invention, the signaling information may include frame flipping flag information indicating whether the left view frame and the right view frame have been flipped horizontally. The detailed description of the frame flipping flag information has been made in the description made with reference to FIG. 28.

According to another embodiment of the present invention, the signaling information may include an SEI (supplemental enhancement information) message, and at least one of the frame packing arrangement information, the depth bit depth information and the frame flipping flag information may be included in the SEI message within the video stream that includes the packing frame. The detailed description of the SEI message has been made in the description made with reference to FIGS. 19, 20, 21 and 28.

According to another embodiment of the present invention, the signaling information may include a PMT (program map table), and the PMT may include frame packing flag information indicating whether the frame packing arrangement information is included in the SEI message. The detailed description of the PMT has been made in the description made with reference to FIGS. 16, 19, 20, 21 and 28.

According to another embodiment of the present invention, at least one of the frame packing arrangement information, the depth bit depth information and the frame flipping flag information may be signaled at the system level. The detailed description of signaling of the at least one information has been made in the description made with reference to FIGS. 25 and 28.

Figure 31:
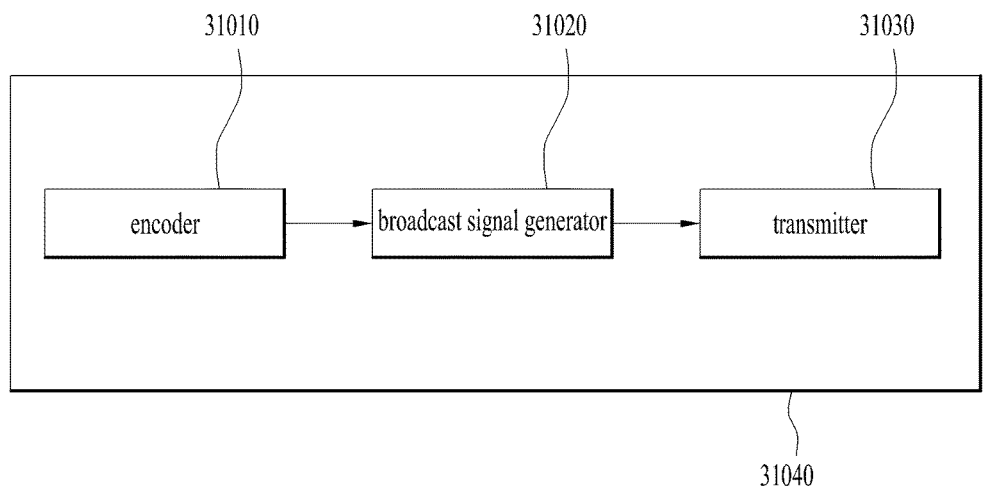
FIG. 31 is a diagram illustrating a configuration of an apparatus for transmitting a broadcast signal in accordance with one embodiment of the present invention.

FIG. 31 is a diagram illustrating a configuration of an apparatus for transmitting a broadcast signal in accordance with one embodiment of the present invention.

An apparatus 31040 for receiving a broadcast signal in accordance with one embodiment of the present invention may comprise an encoder 31010, a broadcast signal generator 31020 and/or a transmitter 31030.

The encoder 31010 respectively downsamples a left view frame, a right view frame, a depth view frame for a left view and a depth view frame for a right view and encode a packing frame obtained by packing at least one of the downsampled frames in one frame.

The broadcast signal generator 31020 may generate a broadcast signal that includes the encoded packing frame and signaling information on a view related to the packing frame.

The transmitter 31030 may transmit the generated broadcast signal.

The apparatus for transmitting a broadcast signal in accordance with one embodiment of the present invention may perform each step corresponding to the aforementioned method for transmitting a broadcast signal. Also, each element may correspond to hardware or may be processed by being included in hardware.

Figure 32:
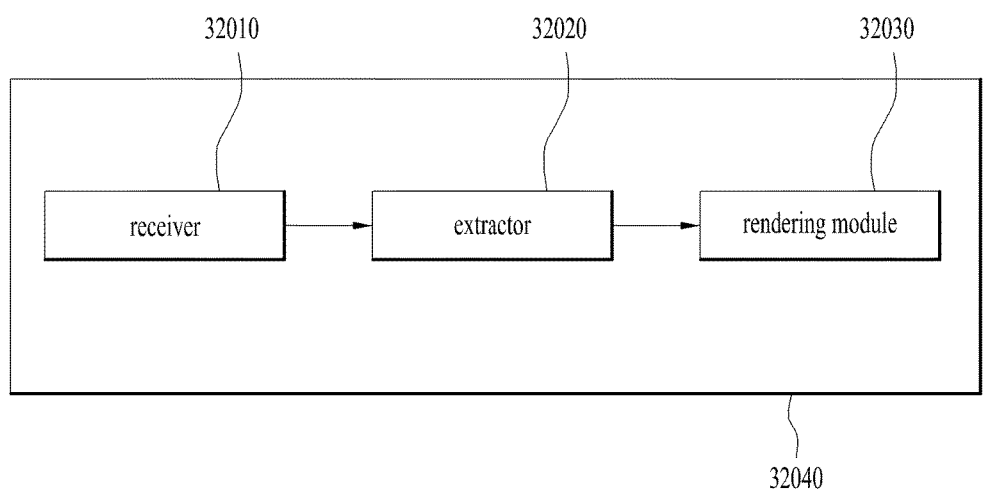
FIG. 32 is a diagram illustrating a configuration of an apparatus for receiving a broadcast signal in accordance with one embodiment of the present invention.

FIG. 32 is a diagram illustrating a configuration of an apparatus for receiving a broadcast signal in accordance with one embodiment of the present invention.

An apparatus 32040 for receiving a broadcast signal according to one embodiment of the present invention may include a receiver 32010, an extractor 32020 and/or a rendering module 32030.

The receiver 32010 may receive a broadcast signal that includes a packing frame and signaling information on a view related to the packing frame, the packing frame being obtained by packing at least one of a left view frame, a right view frame, a depth view frame for a left view and a depth view frame for a right view in one frame.

The extractor 32020 may extract at least one of the left view frame, the right view frame, the depth view frame for a left view and the depth view frame for a right view from the received packing frame.

The rendering module may render a 3D view by using the extracted at least one frame. The rendering module may include the aforementioned view synthesis module, the output formatter, and/or the 3D formatter.

The apparatus 32040 for transmitting a broadcast signal in accordance with one embodiment of the present invention may perform each step corresponding to the aforementioned method for transmitting a broadcast signal. Also, each element may correspond to hardware or may be processed by being included in hardware.

For convenience of description, although the description has been made for each of the drawings, the embodiments of the respective drawings may be incorporated to achieve a new embodiment. A computer readable recording medium where a program for implementing the aforementioned embodiments is recorded may be designed in accordance with the need of the person skilled in the art within the scope of the present specification.

The apparatus and method according to the present invention are not limited to the aforementioned embodiments, and all or some of the aforementioned embodiments may selectively be configured in combination so that various modifications may be made in the aforementioned embodiments.

Meanwhile, the video processing method of the present invention may be implemented in a recording medium, which may be read by a processor provided in a network device, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, and an optical data memory. Also, another example of the recording medium may be implemented in a shape of carrier wave such as transmission through Internet. Also, the recording medium that can be read by the processor may be distributed in a computer system connected thereto through the network, whereby codes that can be read by the processor may be stored and implemented in a distributive mode.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

In this specification, both the product invention and the method invention have been described, and description of both inventions may be made complementally if necessary.

Mode for Implementing the Invention

The mode for implementing the present invention has been described as the best mode for implementing the invention.

INDUSTRIAL APPLICABILITY

The present invention can be used for overall broadcasting industry.

The invention claimed is:

1. A method for transmitting a broadcast signal, the method comprising:
downsampling a full-size left view frame, a full-size right view frame, a full-size left depth view frame for a left view and a full-size right depth view frame for a right view to generate a quarter-size left view frame, a quarter-size right view frame, a quarter-size left depth view frame and a quarter-size right depth view frame;
packing the quarter-size left view frame, the quarter-size right view frame, the quarter-size left depth view frame and the quarter-size right depth view frame into a single frame;
encoding the single frame to generate a video stream, wherein the video stream includes a supplemental enhancement information (SEI) message signaling the video stream, and
wherein the SEI message includes frame type information indicating that the single frame is composed of the quarter-size left view frame, the quarter-size right view frame, the quarter-size left depth view frame and the quarter-size right depth view frame;
generating a broadcast signal comprising the video stream and signaling information for the video stream; and
transmitting the generated broadcast signal.

2. The method according to claim 1, wherein the single frame is generated by mapping depth information included in the full-size left depth view frame or the full-size right depth view frame into components of a color space of the frame in a bit unit.

3. The method according to claim 1, wherein the SEI message includes bit depth information indicating a bit depth of depth information in the full-size left depth view frame or the full-size right depth view frame.

4. The method according to claim 1, wherein the SEI message includes frame flipping flag information indicating that the left view and the right view in the single frame have been flipped horizontally.

5. The method according to claim 1, wherein the signaling information includes a program map table (PMT), and the PMT includes frame packing flag information indicating whether the SEI message is in the video stream.

6. The method according to claim 1, wherein the signaling information includes information indicating that the single frame is composed of the quarter-size left view frame, the quarter-size right view frame, the quarter-size left depth view frame and the quarter-size right depth view frame.

7. A method for receiving a broadcast signal, the method comprising:
receiving a broadcast signal comprising a video stream and signaling information for the video stream;
parsing the video stream and the signaling information from the broadcast signal;
decoding the video stream using a supplemental enhancement information (SEI) message signaling the video stream to acquire a single frame,
wherein the single frame is composed of a quarter-size left view frame, a quarter-size right view frame, a quarter-size left depth view frame and a quarter-size right depth view frame, and
wherein the SEI message includes frame type information indicating that the single frame is composed of the quarter-size left view frame, the quarter-size right view frame, the quarter-size left depth view frame and the quarter-size right depth view frame;
extracting the quarter-size left view frame, the quarter-size right view frame, the quarter-size left depth view frame and the quarter-size right depth view frame from the single frame;
upsampling the quarter-size left view frame, the quarter-size right view frame, the quarter-size left depth view frame and the quarter-size right depth view frame to generate a full-size left view frame, a full-size right view frame, a full-size left depth view frame for a left view and a full-size right depth view frame for a right view; and
rendering a 3D view using the full-size left view frame, the full-size right view frame, the full-size left depth view frame and the full-size right depth view frame.

8. The method according to claim 7, wherein the single frame is generated by mapping depth information included in the full-size left depth view frame or the full-size right depth view frame into components of a color space of the frame in a bit unit.

9. The method according to claim 7, wherein the SEI message includes bit depth information indicating a bit depth of depth information in the full-size left depth view frame or the full-size right depth view frame.

10. The method according to claim 7, wherein the SET message includes frame flipping flag information indicating that the left view and the right view in the single frame have been flipped horizontally.

11. The method according to claim 7, wherein the signaling information includes a program map table (PMT), and the PMT includes frame packing flag information indicating whether the SEI message is in the video stream.

12. The method according to claim 7, wherein the signaling information includes information indicating that the single frame is composed of the quarter-size left view frame, the quarter-size right view frame, the quarter-size left depth view frame and the quarter-size right depth view frame.

13. An apparatus for transmitting a broadcast signal, the apparatus comprising:
an encoder that:
downsamples a full-size left view frame, a full-size right view frame, a full-size left depth view frame for a left view and a full-size right depth view frame for a right view to generate a quarter-size left view frame, a quarter-size right view frame, a quarter-size left depth view frame and a quarter-size right depth view frame, packs the quarter-size left view frame, the quarter-size right view frame, the quarter-size left depth view frame and the quarter-size right depth view frame into a single frame, and encodes the single frame to generate a video stream, wherein the video stream includes a supplemental enhancement information (SEI) message signaling the video stream, and wherein the SEI message includes frame type information indicating that the single frame is composed of the quarter-size left view frame, the quarter-size right view frame, the quarter-size left depth view frame and the quarter-size right depth view frame;

a broadcaster signal generator that generates a broadcast signal comprising the video stream and signaling information for the video stream; and a transmitter that transmits the generated broadcast signal.

14. An apparatus for receiving a broadcast signal, the apparatus comprising:

a receiver that receives a broadcast signal comprising a video stream and signaling information for the video stream;

a parser that parses the video stream and the signaling information from the broadcast signal;

a decoder that decodes the video stream using a supplemental enhancement information (SEI) message signaling the video stream to acquire a single frame, wherein the single frame is composed of a quarter-size left view frame, a quarter-size right view frame, a quarter-size left depth view frame and a quarter-size right depth view frame, wherein the SEI message includes frame type information indicating that the single frame is composed of the quarter-size left view frame, the quarter-size right view frame, the quarter-size left depth view frame and the quarter-size right depth view frame, wherein the decoder extracts the quarter-size left view frame, the quarter-size right view frame, the quarter-size left depth view frame and the quarter-size right depth view frame from the single frame, and wherein the decoder upsamples the quarter-size left view frame, the quarter-size right view frame, the quarter-size left depth view frame and the quarter-size right depth view frame to generate a full-size left view frame, a full-size right view frame, a full-size left depth view frame for a left view and a full-size right depth view frame for a right view; and a renderer that renders a 3D view using the full-size left view frame, the full-size right view frame, the full-size left depth view frame and the full-size right depth view frame.

* * * * *